(12) United States Patent
Platt

(10) Patent No.: US 9,720,401 B2
(45) Date of Patent: Aug. 1, 2017

(54) METHOD AND SYSTEM FOR CONSUMER HOME PROJECTS ORDERING AND FABRICATION

(71) Applicant: George Platt, Centreville, VA (US)

(72) Inventor: George Platt, Centreville, VA (US)

(*) Notice: Subject to any disclaimer, the term of this patent is extended or adjusted under 35 U.S.C. 154(b) by 720 days.

(21) Appl. No.: 14/094,074

(22) Filed: Dec. 2, 2013

(65) Prior Publication Data
US 2015/0153724 A1     Jun. 4, 2015

(51) Int. Cl.
| | | |
|---|---|---|
| G05B 19/418 | (2006.01) | |
| G06Q 30/06 | (2012.01) | |
| G06F 17/50 | (2006.01) | |
| G06Q 30/02 | (2012.01) | |
| G05B 19/4097 | (2006.01) | |

(52) U.S. Cl.
CPC ....... *G05B 19/418* (2013.01); *G05B 19/4097* (2013.01); *G06F 17/50* (2013.01); *G06Q 30/0283* (2013.01); *G06Q 30/0621* (2013.01); *G05B 2219/45229* (2013.01); *G06F 2217/02* (2013.01); *G06F 2217/04* (2013.01); *Y02P 90/02* (2015.11)

(58) Field of Classification Search
CPC .................................................. G05B 19/418
See application file for complete search history.

(56) References Cited

U.S. PATENT DOCUMENTS

| | | | | |
|---|---|---|---|---|
| 5,201,258 A | * | 4/1993 | Cremona | B23D 47/025 |
| | | | | 144/245.1 |
| 6,110,213 A | * | 8/2000 | Vinciarelli | G06F 17/50 |
| | | | | 703/1 |
| 8,088,317 B1 | * | 1/2012 | Karem | B29C 33/40 |
| | | | | 264/219 |
| 8,239,284 B2 | | 8/2012 | Lukis et al. | |
| 2005/0115375 A1 | * | 6/2005 | Dick | B27M 1/08 |
| | | | | 83/358 |
| 2007/0265724 A1 | * | 11/2007 | Mifsud | B21F 27/128 |
| | | | | 700/115 |
| 2011/0060439 A1 | * | 3/2011 | Lukis | G06Q 10/04 |
| | | | | 700/98 |
| 2011/0282476 A1 | | 11/2011 | Hegemier et al. | |

FOREIGN PATENT DOCUMENTS

IT     EP 1202143 A2 *  5/2002  ......... G05B 19/4093

OTHER PUBLICATIONS

International Search Report dated Apr. 13, 2015.
International Preliminary Report dated Jun. 16, 2016.

* cited by examiner

*Primary Examiner* — Jonathan K Ng
(74) *Attorney, Agent, or Firm* — McGinn IP Law Group, PLLC

(57) ABSTRACT

A method and structure for an integrated system for fabricating components for a customer's selected wood-based project, including at least one computer for providing an interface with a consumer to input inquiries and design choices directed to a project having at least one component to be machined in a tandem machine system in which a wood-based project component can be fabricated, regardless whether the component is based on dimensional stock or on sheet material stock. The customer interacts with either a database showing previously-designed projects for implementation using the tandem machine or a CAD (Computer Aided Design) module to develop a new project or a modification of a project in the database.

18 Claims, 9 Drawing Sheets

(TOP VIEW)

(Note: not drawn to scale)

(FRONT VIEW)

(Note: not drawn to scale)

METHOD AND SYSTEM FOR CONSUMER HOME PROJECTS ORDERING AND FABRICATION

BACKGROUND OF THE INVENTION

Field of the Invention

The present invention generally relates to adding new profit centers into the home improvement retail environment by providing capabilities to add value to inventory items purchased by consumers. More specifically, in one exemplary embodiment, an integrated computerized system permits consumers to shop for, to design and price out, and to selectively order the wood and/or composite materials as formed and finished components for projects such as home projects, in a retail environment, and the tooling that will carry out fabrication of the components at a retail location for consumer selected goods.

Description of the Related Art

With the increasing interest by many homeowners for do-it-yourself (diy) projects around the house and the concurrent increased popularity of home improvement centers, the present inventor has recognized that the typical consumer can become quite frustrated attempting many projects, for a myriad of reasons. As examples, many homeowners do not have the tools, expertise, or patience to fabricate finished components for a home improvement project from raw building materials.

Although there are computer-based systems presently employed for use in a factory environment that process materials for specific applications, consumers generally lack access to this capability. While at this time many home improvement centers offer the service of certain types of straight cutting on a 4'×8' sheet, utilizing legacy machinery, in many instances this is inadequate.

However, even if a consumer does have a component custom cut at their local home improvement center, they are often disappointed to find that it does not fit quite right when it is attempted to be installed. Such disappointment is often due, for example, to unintentional mismatches of tolerances or errors during measurement or cutting.

Moreover, a consumer might find a finished product in a store or while shopping online and wonder what the cost would be for such a project to be modified to conform to their surroundings, if it could, for example, be cut and formed for the specific dimensions intended, and then picked up at a local home improvement center as a package of components ready to be assembled.

The present inventor has recognized these problems and has realized that no system is currently available that would permit consumers to even consider this approach for implementing a project. No such system or concept is known in the art prior to the present invention, let alone a system that is integrated from the step of receiving consumers' queries through the steps of fabrication of components into a ready-to-assemble kit of parts, including the options of pricing for delivery and/or on-site installation.

SUMMARY OF THE INVENTION

In view of the foregoing, and other, exemplary problems, drawbacks, and disadvantages of the conventional retail methods and systems, it is an exemplary feature of the present invention to provide a structure (and method) in which a consumer can use a integrated virtual system to evaluate potential home projects, select from and modify predesigned templates, or create their own unique end product and, when ready, to place an order either on-line or while visiting a home improvement store. The consumer can then pick up all components at a local home improvement center as a package ready for assembly, or have them delivered to a designated location, or have a contractor deliver and/or assemble the package, with the delivery and/or contractor services having been included in the project pricing.

This integrated system described herein provides new profit centers to home improvement center retail stores by providing value added to inventory items to be purchased by consumers, as well as providing motivation to visit the retail store to check out possible home improvement projects.

It is also another exemplary feature of the present invention to provide a tandem machining system, capable of receiving instructions and carrying out machining tasks (cutting, routing, milling, drilling, etc.) from a CAD (Computer Aided Design) software module and transferred via a networked CAM (Computer Aided Manufacturing) command/control software interface, that will produce to specification all wood-based components of a project, regardless whether the component is to be based on a sheet material (e.g., 4'×8' sheet of plywood) or on dimensional stock (e.g., 2"×4"×8' or 2"×6"×8' lumber).

It is another exemplary feature of the present invention to compile a print out of all associated information necessary for the completion of template-based projects or completely original designs, including printed labels for components to finished project components, a listing of project components, including additional hardware or other components additional to the fabricated wood components, and printed assembly instructions.

It is yet another exemplary feature of the present invention to offer as an option various levels of assembly, and prefinishing/finishing of all wood-based produced components, as well as optionally painting hardware components. This prefinishing/finishing capability can also be made available to consumers for changing color/finish of off-the shelf inventory items, such as a finished door, without the customer ordering a project involving wood-based components to be formed on the tandem machine system described herein.

Thus, in a first exemplary aspect of the present invention, described herein is an integrated system for fabricating components for a customer's selected wood-based project, the system including at least one computer for providing an interface with a consumer to input design choices directed to a project having at least one component to be machined in a tandem machine system in which a wood-based project component can be fabricated, regardless whether the component is based on dimensional stock or on sheet material stock.

In a second exemplary aspect of the present invention, also described herein is a method, including providing an interface to receive customer interactions from a customer wishing to evaluate a project, the project including one or more components to be formed of a wood or wood-like material to be fabricated from at least one of a sheet material and a piece of dimensional lumber, the interface permitting the customer to evaluate the project by interacting selectively with at least one of: a database comprising projects that can be assembled from components fabricated on a tandem machine system that incorporates a capability to machine wood-based components regardless whether derived from sheet material or from dimensional lumber; and a CAD (computer aided design) module that assists the customer to develop a new design for the project or a modification of an existing design already in the database, the CAD module selectively providing a set of instructions to be transmitted to the tandem machine system to form components on said tandem machine system; calculating, using a processor on a computer, an estimated price for the project if the one or more components for the projects were fabricated using said tandem machine system; and outputting the estimated price as an output of the interface.

In a third exemplary aspect of the present invention, also described herein is a profit center in a retail store environment that includes a facility that permits customers to add value in the retail store environment to items purchased from inventory at the retail store.

In a fourth exemplary aspect of the present invention, also described herein is an apparatus for performing automated tooling processing on wood-base sheet material, the apparatus including: a support frame; a plurality of backing plates supported by the support frame, the plurality of backing plates being supported to be slightly backward leaning; a plurality of rollers along a base of the apparatus, upon which a sheet of material can slide along in directions that are substantially parallel to a longitudinal axis of the apparatus; at least two rotating yoke assemblies that can be selectively rotated into a position to hold the sheet of material against the backing plates; an upper guide rail and a lower guide rail, each mounted on the support frame substantially along the longitudinal axis; at least two vertical guide rails, interconnected together and movably attached between the upper and lower guide rails; a moveable tooling platform movably attached on the at least two vertical guide rails, wherein each of the rotating yoke assemblies comprises servo-controlled manipulator rollers for selectively moving the sheet material along the plurality of rollers, in either a forward direction or a reverse direction, wherein the moveable tooling platform is selectively movable in a direction substantially perpendicular to the longitudinal axis, along the at least two vertical guide rails, using servo-controlled actuators, and wherein the at least two vertical guide rails is selectively movable, as a unit, in the directions that are substantially parallel to the longitudinal axis, along the upper and lower guide rails, using servo-controlled actuators.

In a fifth exemplary aspect of the present invention, also described herein is an apparatus for performing automated tooling processing on dimensional lumber pieces, the apparatus including: a frame supporting a surface upon which can be supported a piece of dimensional lumber; a fence attached to at least one of the surface and the frame, along which fence the piece of dimensional lumber can slide on the surface along a path that is substantially parallel to a longitudinal axis of the apparatus, in either a forward direction or a reverse direction; at least one clamping roller, for holding the piece of dimensional lumber against the fence; at least one servo-controlled manipulating roller to selectively drive the piece of dimensional lumber along the fence in the path; and at least one sawing station, each sawing station configured to drive a circular saw blade to selectively make cuts, under servo control, on the piece of dimensional lumber as the piece of dimensional lumber is selectively driven by the at least one servo-controlled manipulating roller.

The present invention thus provides a new integrated, end-to-end system that permits consumers to evaluate and select a design for home projects, including ability to evaluate alternate sizes, materials, and/or finishes, and to have components for the selected project fabricated at a local home improvement center, ready for pickup to take home and assemble, or, optionally, delivered to a location and possibly even assembled under contract.

The present invention also provides consumers a virtual, integrated approach for project design and fabrication that is flexible in its implementation, such that the system has the ability to easily update possible designs and design options and tooling changes. It also provides a system that is configurable by an operator, in that different tooling fixtures can be adapted for achieving different cutting and forming requirements based on the selected design.

In an exemplary embodiment the integrated system is envisioned to be implemented in retail locations that provide wood products to the consumers, is envisioned as designed to conserve floor space requirements in such retail environment, and is envisioned to permit such floor space to be utilized as a profit center.

Because of its integrated approach, a consumer can plan and implement projects without having to invest in tooling or develop expertise or being exposed to the dangers and risks of woodworking tools, thereby eliminating much of the frustration and errors typically experienced by conventional consumer attempts to implement home improvement projects, not to mention safety concerns. The consumer can evaluate obtaining components for any portion of the project up through the option of getting all components necessary to complete the entire project and can evaluate varying amounts of completion for these components up through and including the final finish on wood components and a complete package of project components, including non-wood components, as collected and packaged together ready for pick up by the consumer at a local home improvement retail store to take home for assembly.

The present invention gives consumers the opportunity to get value added to inventory items that they purchase from their local home improvement center. This value-added capability provides the home improvement center a new profit center for their retail operation.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
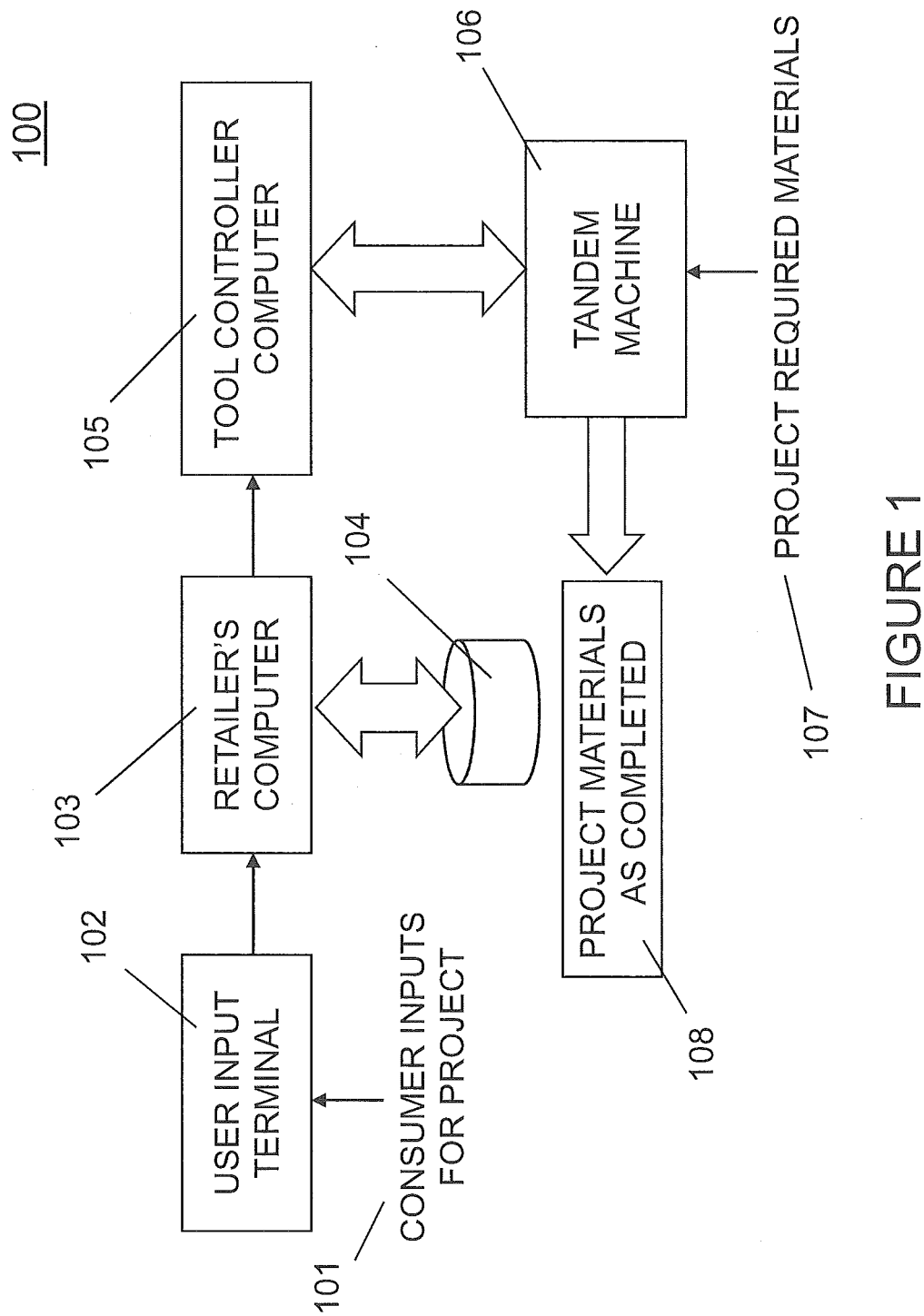
FIG. 1 shows exemplarily in flowchart format 100 the overall concepts and system for the present invention.

Referring now to the drawings, and more particularly to FIGS. 1-9, exemplary embodiments of the method and structures according to the present invention will now be described.

The present invention provides an integrated system for a consumer to design, price out, order, and selectively have fabricated locally, from standard dimensional lumber stock, such as standard 2"×4"s, and standard wood-based sheet materials, such as 4'×8' sheets of plywood, composite board, wafer board, or any other sheet material that would use conventional wood tools and techniques, for the consumer's desired home improvement project, in ready-to-assemble components. Thus, the present invention permits consumers to design and obtain custom fabrication of their own projects without having to buy expensive tools or learn how to operate such tools or be exposed to safety and health risks associated with operating woodworking tools. In a preferred exemplary embodiment, the present invention provides such custom design/build capability in the lumber/building materials retail environment, rather than specialized manufacturing facilities or an expensive middleman.

Although the present invention is described as oriented toward "home projects", this descriptive is not intended as limiting, since retail lumberyards and home improvement centers service a wide array of consumers including business entities having requirements for projects at work locations and, of course, even the building industry. Therefore, the present invention is intended to provide an integrated system by which any consumer, whether a home owner, a professional contractor, or a corporation, can interact with any entity that uses the system and/or equipment described herein, for purpose of evaluating, designing, and ordering component(s) for a project, and receiving the ordered component(s) after fabrication using this system, equipment, and method.

When integrated into a network of retail stores, the present invention provides a mechanism whereby floor space can become a new profit center. It should be clear however to one of ordinary skill in the art that, although the present invention is envisioned as exemplarily located in retail environments which sell lumber and lumber products, such as stores in a chain similar to Lowes® or Home Depot®, because such locations are widely available to consumers, such aspect is by no means limiting to the concepts described herein. That is, the integrated system and approach of the present invention would clearly also be applicable to any business entity that specializes in custom-designed wood-based projects for consumers of any category or could be integrated into an existing business entity related to providing wood-based products. In such alternate environments, the present invention would provide a new source of possible revenue that utilizes the power of the Internet to interface with new customers having custom design requirements.

In another aspect, exemplary embodiments include various means for consumers to interface with the integrated system, including such interfaces as a computer in the retail environment having the tooling to fabricate the finished components or using remote terminals interconnected via a network, such as the consumer's own home computer.

Moreover, given recent trends for consumers' use of mobile communications devices, also included in the possibilities for interfacing with the integrated system, as envisioned by the flexible approach and capabilities of the present invention, is an application (i.e., an "app") that can be downloaded onto a consumer's mobile device. From this app the consumer can interface with the system of the present invention for receiving an estimate of a cost of having components fabricated locally into ready-to-assemble parts, and selectively place an order through the mobile app.

As an example of this aspect of the invention, the consumer might be shopping at a retail store and notice a finished product that is of interest. Using this downloaded app and/or accessing a remote server via the Internet, would permit the consumer to interface with the integrated system of the present invention to evaluate the price of this finished product or something similar, if undertaken as a home project, thereby providing the consumer the option of having components fabricated at a local retail store for a project that can be used as an acceptable substitute for the finished product of interest.

The consumer could himself or herself then assemble this project at home, rather than purchasing a completed consumer product that presumably would cost significantly more and is available only in the existing size and configuration and fabricated with only the predetermined materials of the demonstration model. The consumer would be ordering a ready-to-assemble kit of parts to be picked up at a local home improvement store, including labels on each component and a set of instructions for assembling the project, as correlated with the component labels and a list of any additional components that are needed to complete assembly of the project. The system also allows the consumer the option of having the project price to include delivery and/or on-site assembly/installation by a contractor. In this manner, the present invention could result in consumers purchasing more inventory stock from home improvement center retail stores rather than purchasing finished articles from department stores.

From the above brief summary, it should be clear to one having ordinary skill in the art that the present invention provides consumers with a large degree of flexibility for wood-based home improvement projects, including the possibility of end-to-end project management whereby the consumer can custom-design a project and have components fabricated, delivered, and assembled.

However, as will be apparent from the description hereinbelow of the tooling, the system additionally provides flexibility in other aspects, including various levels of sophistication for the tools that will fabricate components of a project and flexibility in the tooling heads that can be attached to provide different fabrication results. It is further noted that, in an exemplary embodiment, the tooling aspect of the present invention is also intended as having been designed for compact usage of floor space in a retail environment.

FIG. 1 shows a non-limiting exemplary flowchart 100 of key overall concepts of the present invention. In the approach illustrated by FIG. 1, a consumer wishes to consider embarking upon a specific project of some sort, such as a home project, whether a simple replacement of a wooden component of an existing structure, such as a house, garage, or shed, or an existing piece of furniture, such as a chair or shelf, etc., or even the fabrication of an entirely new piece of furniture or structure such as an add-on deck. It should be clear to one having ordinary skill in the art that the above listing of possibilities are not intended as limiting, since the present invention will be understood as providing capabilities for an infinite variety of projects that any consumer might desire, whether related to "home improvement" projects, a term intended herein to include projects related to business, industry, government, etc. The present invention thus provides a flexible mechanism for consumers of all types to consider alternatives for wood-based projects.

In an initial step 101 shown in FIG. 1, the consumer interacts with a user interface, possibly remotely from her home or business computer 102, using, for example, the Internet, or even via an app in a mobile device, or possibly from a workstation, kiosk, or computer 103 located on-site at, for example, a retail environment, such as a lumber or building materials retail store. Other interfaces would also be possible, so these examples are not intended as limiting. For example, a consumer might access a remote server via the Internet that, in turn, communicates with a computer located at a local retail entity or at a remote location.

In a typical exemplary configuration of the integrated system of the present invention, the consumer would thereby interact with a store computer 103, typically either as located in the store that provides or has access to a database 104 of information for possible home improvement projects. Alternately, computer 103 could be a remote server serving an entire retail chain or group of stores using, for example, the Internet. In an exemplary embodiment, a computer 105 then provides instructions to a tandem machining system (i.e., a duo-machine system) 106 that performs functions such as cutting and/or other processing on the materials needed for the desired project.

Raw wood stock materials are loaded in step 107 onto the tandem machining system 106 by a store employee, as based on instructions received from the computer 105 for each wood-based component for a selected project, and project components are then available in step 108 to the consumer who placed the project order.

It should be clear to one of ordinary skill in the art that other configurations are possible, including, for example, a configuration in which the local computer 105 is used both for consumer interface as well as providing the control instructions to the tandem machining system 106, or that the user interacts with a computer located in the store, or that the database 104 is associated with computer 105, etc.

Thus, the tandem machining system 106 is a key component of the present invention and comprises two machines.

The first machine of the tandem machine system is a dimensional lumber machine that includes a manipulating rotor assembly that routes raw project material (e.g., 2"×4", 2"×6" lumber) and manipulates that material through a series of specialized precision tooling/feature production stations to fabricate project components made from standard dimensional lumber, as typically based on tooling instructions from a controller computer 105, although a manual mode is possible in which an operator provides settings from the machine's control panel.

The second machine of the tandem machine system is a sheet cutting machine to fabricate project components made from standard sheet material (e.g., 4'×8' plywood) and is designed to operate, again typically based on controller computer inputs, in any of three different modes:

1) A manual mode, similar to the manual mode of operating conventional sheet machines typically located in home improvement centers, except that the present invention uses the control panel for input commands into a servomechanisms to selectively provide cross cutting or rip cutting to precise distances from the base lines.

2) A servo-controlled mode in which the sheet material is moved along its supporting rollers, in the x-axis, while the tooling platform is moved only up/down, in the y-axis, as the tooling platform is locked at the machine centerline, to thereby produce any two-dimensional shape in the sheet material, in stencil-type manner. It is noted that the term "stencil-type" is used herein to mean that the cutting operation of the sheet material provides an outline of the desired two dimensional shape as cut out except for attachment points that keep the partially-cut desired shape attached to the sheet material until the entire desired shape has been formed except for the attach points. Once the desired shape's outline is completed, an operator then rolls the sheet out of the sheet cutting machine and the desired shape is subsequently severed from the sheet by a series of cuts by the operator, using small power or hand tools. Mode 2 is fast and anticipated as satisfying accuracy sufficient for most consumer projects.

3) A servo-controlled mode in which the tooling platform is moved in both the x- and y-axes, with the sheet material component(s) being held rigidly to the sheet machine surface on one or more of eight fixed tool plates that together form a single support plane, using pins and clamps that are selectively inserted into holes predrilled on these eight fixed tool plates. Alternatively, the project component could be affixed to the tool plates using a special carrier plate having pin holes for inserting pins to hold the components steady and treaded holes to insert a clamping fixture that holds the work piece flat against the carrier plate. The tooling platform has capability of using different interchangeable tooling heads, which can be servo positioned to create a variety of precision cuts and cut depths, including tailor (e.g., profiled) edging and etching of customer end products and/or components. Mode 3 is more precise than mode 2 operation, at the expense of slower speed, but in many projects only specific edges of a limited number of project components would be involved in a mode 3 operation.

Both the first and second machines are capable of CAM control as well as manual control by an operator, using their respective local control panels.

The consumer application program used by a consumer to interact with the integrated system of the present invention provides a user-friendly basic CAD and intermediate user CAD/CAM software which provides users the ability to develop designs with their selected materials, supplies, scaling, and design features/specifications, as well as indicate individual design elements and final product pricing. Both software packages will employ CAD implementation rules steering the user towards technically feasible product solutions.

Database 104 contains templates and other options and calculation modules for developing material lists, pricing data, and construction details for potential projects, possibly as located at one or more centralized locations for the retail chain, as accessible to any location having the tooling described by the present invention. In this form of implementation of the invention, a central computer, such as a server accessible via the Internet, would service any number of tooling stations located in any location, preferably, although not necessarily, based upon accommodation and convenience of local consumers. However, it should be clear that this database 104 could also be stored on the local computer 105 rather than a remote server 104.

Design data elements including design templates, scale parameters, material types, labor hours, machining time, and deliverable processing elements will be contained as parametric data within the database 104, enabling user access to the latest user design options, materials, and most accurate price quotes.

Tabulation of retail cost will be developed using software algorithms which tabulate vendor specific cost units specific to vendor materials, supplies, machine cycling time, design elements (e.g., features/specifications) and materials, as well as end-product preparation time (e.g., packaging), with options for delivery and installation.

In the exemplary embodiment, the integrated system of the present invention is envisioned as preferably providing fabrication capability at any of various local facilities, such as local lumberyards, home improvement centers, hardware stores, building materials retail centers, etc., that provide lumber and/or wood products to the public as a retail entity. Each location would preferably have the tandem machining system 106 consisting of two machines which together can cut and form all wooden project components, whether based on sheet material or dimensional lumber. The two machines receive positioning and tooling commands from a local computer 105, although it is also possible to envision a system that receives computer commands from a remote location. It should be clear that any specific project may require only one of the two machines making up the tandem machine 106 to actually be utilized, depending upon specific components required for that project. The concepts and at least various components of the integrated system of the present invention could also be incorporated in industrial facilities, including industrial facilities that are normally not providing retail services to consumers but that would find the tooling of the present invention useful as an asset for their particular purpose and/or operations.

If incorporated in a chain of retail stores, the basic CAD user software module could be implemented to send a notification to the retail store jobs management system for user concept feasibility check, where design, materials availability and implementation related tasks will occur. Once the concept feasibility check is successfully completed, the execution of the CAD/CAM software at the selected store location will commence. The intermediate user CAD/CAM software will then generate and transfer, via the networked CAM command/control software interface, the machine readable instructions enabling execution of the described machining-enabled project production element/components through the end-to-end system.

A key point to be made from these possible examples described above, is that the present invention provides flexibility in fabrication, both for the consumer and for the more specialized segments of the economy, and is envisioned as providing localized fabrication capability that consumers can take advantage of, without having to place an order to a remote company or store and then await shipment of the desired components. Instead, the present invention is envisioned as providing components locally for a consumer's selected project, either with local delivery to an on-site location or available to be picked up as a package of project components at a local home improvement center.

Figure 2:
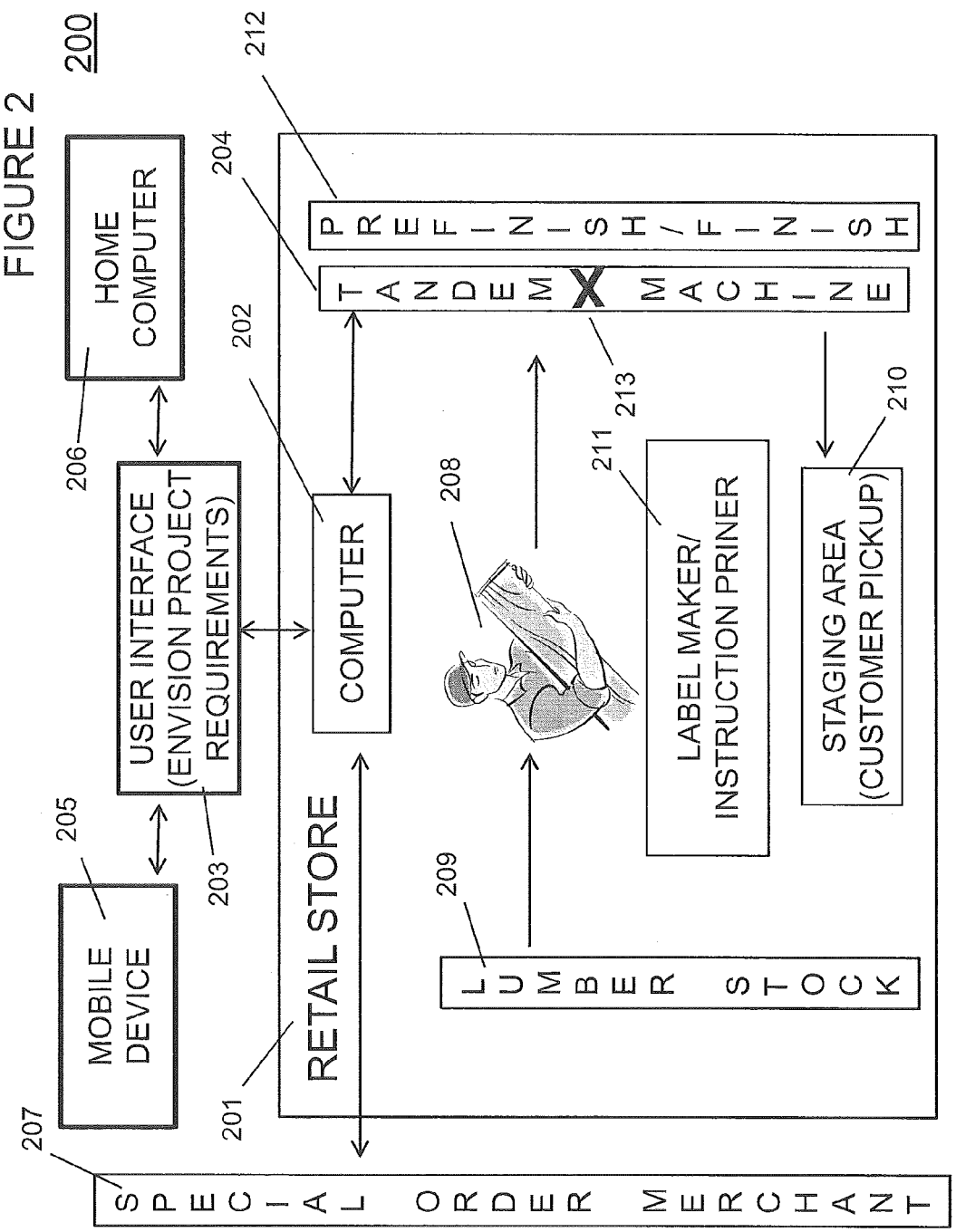
FIG. 2 shows exemplarily in schematic diagram format 200 how the present invention could be implemented in a home improvement retail environment.

FIG. 2 shows an exemplary block diagram 200 of the system of the present invention as installed in a retail store 201 having a computer 202 to provide inputs from a user interface 203 and to provide commands to the tandem machining system 204 used to fabricate wood components of a consumer selected project. As mentioned relative to FIG. 1, the user interface 203 could be a module executing on the local computer 202 or could be a module executing on a remote server, with the consumer interacting with the user interface 203 either via a mobile device 205 or a home computer 206, although other input mechanisms are possible, such as consumer interactions directly with the store computer 202.

As another example of the flexibility provided by the present invention, FIG. 2 also demonstrates an entity referred to herein as a "special order merchant" 207, which entity can serve various alternative roles in the present invention, so that there could actually be a plurality of special order merchants associated with the method of the present invention. For example, in one possible role, the consumer might contact the retail-store-oriented system of the present invention (e.g., in-store computer 202) via a special-order merchant 207, which would, for example, be an entity that specializes in providing custom-designed home projects for homeowners. In this role, the special-order merchant 207 accordingly could be, for example, a contractor or sub-contractor that undertakes home building or home improvement projects, with the contractor/sub-contractor then communicating with the store computer 202.

Alternatively, the special-order merchant 207 might be a business entity that specializes in executing the final assembly of the project for consumers, so that the consumer would be relieved of having to assemble the project himself or herself. The special-order merchant 207 might also be a person or business entity that specializes in home improvement projects but does not wish to itself purchase, operate, and maintain machinery that would fabricate components for such projects.

Additionally, the special order merchant 207 could be a business entity that provides project components that cannot reasonably be fabricated locally using the two machines included in the tandem machining system 204. These would be project components other than those capable of being fabricated on one of the two machines described as part of the present invention. Examples of such additional components might include metal brackets or fasteners or panes of glass. Another example might be wood components that require wood turning operations.

FIG. 2 also shows how, in the actual fabrication stage, an employee 208 of the store 201 would receive from the computer 202 a listing of raw material for the wood-based components for the project, retrieve appropriate materials from stock 209, and load the materials onto an appropriate one of the two machines comprising the tandem machining system 204 for cutting, shaping, or otherwise fabricating the components of the desired project.

At this point it is noted that, although it would be possible to have the necessary materials extracted from stock 209 via an automatic, robotic, material retrieval subsystem, a preferred exemplary embodiment of the present invention envisions that the material retrieval is done manually, so as to eliminate the initial high cost of a complex, automatic material retrieval subsystems. This exemplary embodiment in which a store employee manually loads stock into the two wood fabrication machines thereby makes the present invention much more attractive as a system to be implemented in retail environments as a widely-distributed system in conventional home improvement centers. Using manual retrieval of materials would also conserve floor space occupied by the system, another important goal of the present invention when implemented in a chain of retail stores. Of course, it should be clear that the concept of the present invention includes the flexibility of adding automatic material retrieval subsystem(s), if desired, particularly if the present invention were to be implemented in a large scale, centralized manufacturing environment rather than a retail environment.

Returning now to FIG. 2, a computer, perhaps even the same computer that provided the customer an interface to the system for evaluating alternatives and placing an order for an intended project, would then provide control commands to the two machines of the tandem machining system 204, for cutting, shaping, forming of wooden components for the project. All project components of the desired project would then be stored in a staging area 210 for the customer order, so that these finished project components would then be available for pick up by the consumer or, possibly, for shipping to the consumer, preferably located locally to the location providing this fabrication service.

FIG. 2 also shows a prefinishing/finishing station 212 as implemented to be a manually/computer-controlled component of the integrated system of the present invention. When components have been machined, the operator uses tailored fasteners to attach the project components to a conveyor chain, which transports end products and sub-components through a spraying chamber, past moveable sprayer nozzles, then followed by transport through a drying chamber. Both the spraying chamber and drying chamber are maintained under negative pressure and could receive computer commands for at least some aspects of their operation, as well as, selectively, manual commands from an operator's control panel.

Although described herein as an element of a larger integrated system, the prefinishing/finishing station 212 can itself provide a new profit center to a retail store by providing the capability for a consumer to add value even to a finished product. Thus, if the consumer purchases a standard louvered door, the consumer might prefer to pay a small additional cost to have the door painted a different color rather than repaint the door herself, given that such louvered doors have many surfaces that are quite time-consuming to cover with a paint brush.

Also shown in FIG. 2 is a label maker 211 which prints out a label to be attached to each component fabricated by the tandem machining system 204, thereby permitting these components to be positively identified for purpose of final assembly of the desired project. The label maker 211 is exemplarily shown in FIG. 2 as including a printer that is used to print out assembly instructions to the consumer, for projects that are sufficiently complex to require such instructions, with the assembly instructions referring to identification labels supplied by the label maker. The printer also prints out a listing of any additional required hardware for project completion and, possibly, a listing of local special order merchants that might be able to provide components or services related to the project.

Label maker 211 could take on any of various embodiments, and this aspect of the present invention is not limited in details of implementation of providing labels. For example, it could be as simple as using a simple printer using conventional sheets of paper, or adhesive-backed paper, as possibly pre-sized or pre-cut to provide individual labels to be affixed to wood components as finished or as affixed during a predetermined phase of completion. A more elaborate embodiment could use other material, such as tape or plastic strips, with or without adhesive on one surface. Another possible embodiment of a label subsystem could use specialized print techniques that would form raised or recessed letters or numerals on a material, similar to conventional manual label makers that provide embossed letters or numerals on a strip of adhesive-backed plastic.

The point at which the label is attached should also not be considered as limiting. However, in an exemplary embodiment, the operator would be instructed by the computer to affix a label at the stage that the component is essentially completed for that order. Thus, if no finishing has been ordered as part of the project order, then the label might be affixed upon completion from the tandem machine. If the component is going to receive processing in the secondary operations station or the finishing station, then the label would be affixed after such additional processing, although some operations such as finishing processing might require a temporary label be affixed in order to help the store employee to correctly identify the components throughout these operations.

In some projects, it might be possible to provide labels that, for example, have markings on pre-formed adhesive strips, and the retail store employee could affix the label to the piece as it is completed by the tandem machine system, perhaps in predetermined surfaces of the components such as end tips where it would not affect the finishing operation. Another possibility might be stapling a label to a surface such as an end surface of a component, so the consumer could easily pry the label off as the pieces are assembled and the staple holes would not detract from the appearance of the assembled project.

For example, if the consumer's project is a deck, the label maker would identify components so that each component could be easily placed in the desired location during assembly of the project, with minimal try-and-error by the consumer for final on-site assembly. It might be difficult, for example, for a consumer to fit together the components for the top of the deck, particularly for decks with odd shapes. Having components labeled, along with instructions on fitting together each labeled component would make the assembly much easier, particularly if labels are positioned to be in standardized, non-visible surfaces of the finished project. Instructions for completing the project could also exemplarily be printed out from a printer, perhaps as part of the labeler component 211, or perhaps as a printer separately associated with the store computer 202.

The present invention, in a preferred but non-limiting embodiment, is intended to be incorporated into existing local retail environments such as home improvement centers, where floor space is typically considered to be at a premium. Accordingly, in one exemplary goal, the present invention is intended as designed to utilize floor space conservatively and at minimal implementation cost, including using a modified version of a cutting fixture already commonly employed in such home improvement centers, as one of the tandem machining system 204 of the present invention that serves as the core fabrication tooling capability.

A key feature of the present invention is that it is intended to provide components that are ready-to-assemble, including any finish coating(s) selected by the consumer. Accordingly, a prefinishing/finishing station 212 is also provided to apply selected finishing materials. In a preferred exemplary embodiment, the prefinishing/finishing station 212 is physically located adjacent to the tandem machining system 204, in order to conserve retail store floor space.

Also shown in FIG. 2, as labeled 213, is an area "X" between the two machines of the tandem machining system 204. This area, referred to herein as the "secondary station", includes a work bench for tools that permit the store employee 208 to provide manual inputs into the project, as will be described later.

Another key benefit of the present invention exemplarily illustrated in FIG. 1 is that the consumer can selectively price out options for the desired project and then make informed decisions for the final configuration of the desired project, since the store computer 102 or 105 would preferably be configured to calculate an estimated project price as the consumer interacts with the system. Typically, pricing estimates would be extrapolated from a standard project price as a baseline. Thus, if the consumer wants to price out different materials or dimensions, the estimated price of a standard project would be adjusted, keeping in mind that different dimensions might invoke discrete changes in price and/or inflection points in the price curve, due to having a different size of standard raw wood stock for one or more project components.

For example, different grades of material could be used for the project, meaning that higher quality wood such as an expensive hardwood would cost more than lesser quality wood such as pine. As a second example, the consumer might prefer to be notified that a slightly different dimension might be substantially cheaper, since a difference of even less than an inch in the overall project size might mean that a larger, more expensive piece of stock would have to be used to achieve the desired project size, and the consumer might prefer to settle for a different dimension of the project if the cost is considerably different and the consumer is advised of this cost differential if a smaller overall dimension would be acceptable.

Thus, as a possible feature, the present invention could include one or menu selections available to the user, so that the user interface 203 automatically makes suggestions for alternate sizes based on pricing calculations or provides guidance for possible options for lowering the price, based upon determining which components have sizes which might be key components for possible price reductions of the overall dimensions of the project could be modified. For example, a shed that the consumer initially specifies as being 8'-6" in length could be demonstrated as being significantly cheaper if the consumer were to be willing to have this dimension reduced to permit nominal 8'-0" boards and sheet material to be used as the basis for the key structural components in this length dimension. Similarly, a width dimension based on 2'-0" increments could significantly reduce project cost by reducing the amount of materials that might be necessary for custom-sized projects. Additionally, pricing information could include breakdowns for various possible project variations, such as the different costs for variations due to, for example, different sizes, different materials, or different degrees of finishing the components. Providing such alternatives is one more example of adding value to consumers for purchased inventory items.

The two machines of the tandem machining system 204 can selectively be either manually-operated (via the operator's control panel adjacent to each machine) or computer-controlled and together provide tooling capability that can potentially perform all operations on dimensional lumber (e.g., 2"×4"×8') and sheet wood products (e.g., 4'×8' sheets of wood, composite or wafer board, or similar sheet materials, etc.), that are commonly conventionally used in home projects (these exemplary conventional standard sizes, e.g., 2"×4"×8', are not intended as limiting the concepts of the present invention). In general, these machines would be computer-controlled because of the benefit of accuracy of machining operations and elimination of having an operator take time to make measurements and move stock material around to achieve the desired operations off of these measurements.

Manual control would, therefore, likely be used for such instances where the consumer wants a quick and simple single cut on one or a few pieces of stock material, and the manual operation would be more convenient than engaging a computer-controlled operation. It is noted that "manual" control for the tandem machine 204 actually involves manual settings of controls on a control panel respectively associated with each of the two machines making up the tandem machining system 204, or, in some possible exemplary embodiments, a single control panel that combines all the controls for both machines. A key reason for restricting manual operation as utilizing control panel inputs is safety of the operator, as well as greater accuracy and speed that such control panel inputs would provide, particularly since the manual control could include an automatic centering of the work piece or other referencing mechanism, using a fast "jog" servo speed during which the work piece is moved much faster than during normal processing speeds.

Included in this exemplary embodiment of the tandem machine 204 is the capability to add, interchange, and/or intermix tooling heads and attachments so that a variety of tooling effects can be selectively achieved for each project. Thus, each machine making up the tandem machining system 204 could also have its associated tooling dock in addition to its associated control panel, although a preferred embodiment uses the docking station only for the sheet metal cutting machine. In this embodiment no docking station is considered necessary for the dimensional lumber machine since this exemplary embodiment would have all tooling considered at this time as reasonably required for routine consumer project tool requirements, as will be explained later in the discussions of the details of the tandem machine system 204.

As another example of the intended flexibility of the integrated system of the present invention by noting that a special order merchant 207 might be an entity that provides components that contribute to a project and that may not so readily available for store 201 to provide to the consumer's selected project. For example, a specific project might require metal components that would not be readily available at a specific retail store 201, but would be available through the special order merchant 207, such as a welding shop or other operation that specializes in components other than wood-based components. Another example might be components not achievable with the tools of the present invention, such as wood-turned components that would not be available from the two machines of the present invention, and the consumer can get pricing information for such components, giving the consumer the opportunity to make other design choices if the non-available component were to be replaced by a component that could be fabricated by the tandom machine system. Thus, if the more intricate design requires a project design component that is very expensive if supplied by a special order merchant.

Yet another example of a project component that might be received from a special order merchant 207 might be a glass pane for a window, particularly if the glass has special effects such as engraving or edge polishing or bevels. Thus, a consumer could pursue a project of replacing a custom glass window and take advantage of the present invention to select and order fabrication of the wood components. The glass pane might better be provided by a special order merchant 207, which provides this component to store 201 as an input that is to be associated with the consumer project or to be picked up by the consumer at the special order merchant's location. Such outside specialty components could be received at the store 201 and placed in the staging area 210 in a location reserved for accumulating components for that project, to be matched up with the project components fabricated in-store by the tandem machine 204.

Thus, in this aspect, the present invention has the flexibility that it can serve as an overall project management function in which all necessary components can be accumulated by store 201, or at least identified, including those components not readily available at store 201 itself. Thus, again, the present invention adds value to consumers for inventory items purchased at the retail store.

Along this line, an exemplary embodiment of the present invention could maintain in its database of projects those components not readily available from store 201 and provide the consumer an option of having those components delivered to the store 201 or the option of identifying these components to the consumer so that the consumer could pursue them elsewhere, including possibly providing the consumer with some source or sources for obtaining these additional project components. Alternatively, the consumer might prefer to modify the project design to eliminate such components, particularly if the alternate design still satisfies the consumer's fundamental project requirements.

Figure 3:
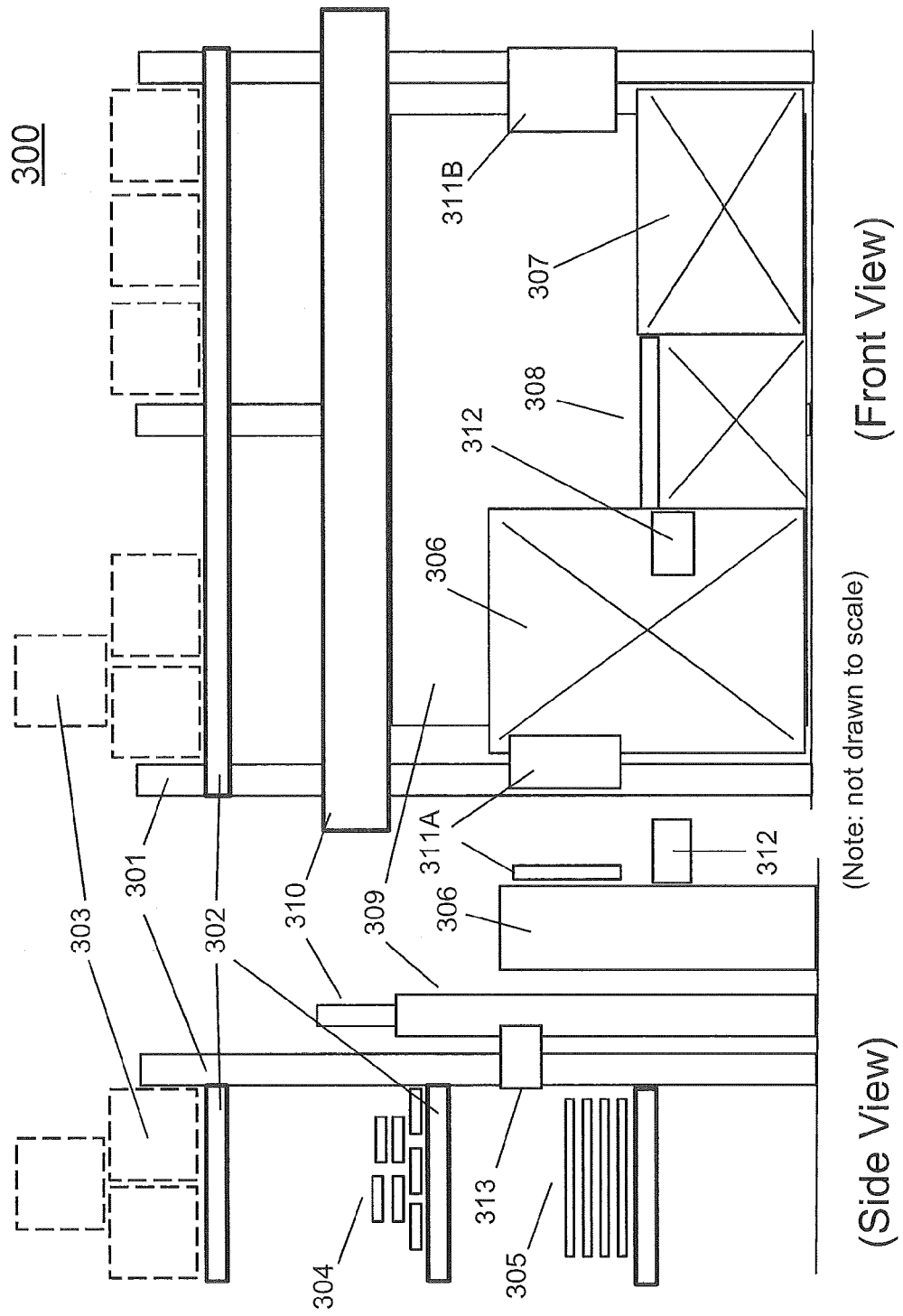
FIG. 3 shows an exemplary embodiment 300 of a store production cell.

In the exemplary embodiment described herein and as shown in schematic diagram format 300 of side and front views (not drawn to scale) in FIG. 3 of a store production cell, the present invention is intended as occupying minimal floor space in a home improvement center having conventional upright supports 301 that typically have cross arms 302 upon which are stacked stock inventory, such as boxes 303, dimensional lumber 304, or sheet material 305, as is common in most home improvement centers. The components of the system of an exemplary embodiment of the present invention would be sized to fit into adjacent bays in one of the rows of uprights of a conventional home improvement center, preferably in a row that provides ready access to stock inventory most commonly used for consumer projects.

In the front view, on the right side of FIG. 3, can be seen the tandem machining system, comprising one machine 306 for sheet material and one machine 307 for dimensional stock. Secondary operations station 308 is a work area that permits additional operations such as sanding and deburring of components, as well as the final separation of components fabricated on the sheet machine 306. Prefinishing/finishing station 309, located behind the tandem machine system in this exemplary embodiment, permits an application of finish coatings such as stain, varnish, paint, etc., so that project components can be selected with options providing components more nearly in a ready-to-assemble condition. As will be explained shortly, the prefinishing/finishing station 309 includes a conveyor mechanism 310 upon which project components will be attached for transport through spray and dry stations (not identified in FIG. 3) in the prefinishing/finishing station 309, as well as a control panel 313 directed to operations related to this station 309, such as ability to jog the conveyor to different positions and manual controls for nozzle direction and flow rate.

The prefinishing/finishing station control panel 313, is preferably located at the input side of the prefinishing/finishing station 309, to assist the operator in loading components onto the conveyor belt. A smaller, simpler control panel (not shown) might also be located at the output side, again to assist the operator, but now for the removal of finished components from the conveyor belt 310.

Each machine 306, 307 of the tandem machine system also has an associated control panel 311A, 311B, that provides power control switches and knobs and switches providing capability for an operator to make control settings to the machines 306, 307, as well as manual settings to provide a form of manual mode. The sheet machine 306 also has an associated tool head docking station 312 to store tool heads and attachments that can selectively be attached to the machine for specific tooling operations on that machine. For example, the docking station 312 for the sheet machine 306 might store any number of conventional standard off-the-shelf tooling attachments for different tooling processes such as sawing, drilling, milling, and routing.

Secondary operations station 308 is envisioned, in a preferred exemplary embodiment located at a retail entity, as being a work area that is largely used for manual inputs to the project by an employee of the store having the integrated system of the present invention. A primary reason for relying upon manual inputs at this station is the cost reduction of the initial investment and the increased flexibility that can result from having such a manual-input station for different consumer projects. In one sense, this secondary operations station 308 can be considered as related to the materials-retrieval task in which a store employee retrieves from stock the wood materials needed for a specific project, and then proceeds to attend to secondary aspects of the project, such as accumulation of non wood-based project components such as fasteners or to additional component processing such as deburring, sanding, or severing attach points for components as resulting from sheet cutting operations. The labeler could also be located in the secondary operations station 308, for convenience of being near the tandem machine system.

A second key function of this secondary operations station 308 is that it provides the work station at which sheet material components are finally separated from sheet material, such as a 4'×8' sheet of plywood, after having been essentially cut into shapes for sheet-based components of the project while still leaving it attached at selected points around the edges, a mechanism referred to herein as "stenciling".

In this function related to stenciling, the 4'×8' sheet of material can be slid out of the sheet machine 306 into the secondary operations station 308, using the rollers in the base of the sheet machine, as augmented by additional rollers in the secondary operations station area intended for this purpose. The store employee would then use cutting tool, to manually cut through the stencil attachment points to thereby finally separate the project sheet components from their original sheet material. As explained later, for some projects requiring more precise finishing processing, these separated sheet components can then be returned to the sheet machine for final edge processing in a mode 3 operation of the sheet machine 306.

Viewed as shown in FIG. 3, the present invention has been designed to fit into a compact floor space of a retail store of a home improvement center, as a new profit center, in a manner that capabilities of the integrated system could be implemented in stages, if preferred. Thus, for example, a retail store might implement the integrated system by initially converting their conventional manually-operated sheet machine into a servo-controlled sheet machine 306 described in the present invention, along with the dimensional tooling machine 307, and then later provide labeling capability and/or a finishing station 309. However, the prefinishing/finishing station 309 can be considered as a profit center for the retail store in its own right, since it can be used by the store to provide and charge for the service of spraying on finishing material to other off-the-shelf inventory items in the store, such as a pre-hung door module.

Similarly, the secondary operations station 308 could then be easily added as one more stage of developing the integrated system in which a store employee could perform such additional tasks as sanding and/or deburring of the project components, using such conventional tools as electric or non-electric (e.g., manual or pneumatic) sanding or deburring tools, although power tools would be preferable, for efficiency. To perform such secondary tasks, it is envisioned that this secondary operations station 308 comprises a work area having at least one table large enough to support the project components for such tasks as sanding, deburring, etc., tasks, including holding fixtures, such as a vise or vises or other possible holding fixtures that would facilitate such operations, and any specialized tools for such specialized operations, such as power or hand tools specially designed or suitable for such secondary tasks.

Preferably, for convenience and efficiency, including floor space requirements, the secondary operations station 308 is located between the two machines 306, 307, and, in a preferred exemplary embodiment, would be designed so that the sheet material from the sheet machine 306 could be simply rolled from the sheet machine 306 into the secondary operations station 308, using an extension of the frame used to support the sheet material in the sheet machine 306, with appropriate rollers and frame elements for supporting the sheet material in the secondary operations station 308 while still providing convenient access for manually severing the project sheet components from the sheet material.

Additional tasks that might be done in the secondary operations station 308, in addition to such operations as sanding or deburring, might include the accumulation and packaging of additional components, such as fasteners, brackets, specialized hardware, the printing of instructions for final assembly of the project by the consumer, and/or affixing labels to components. Of course, additional tasks could also be done in the secondary operations station 308, including other tasks such as might be related to prefinishing the project components, that a customer might desire to have done at the store rather than do himself or herself as part of the assembly of the project at home. Typically, at least some of the secondary operations might have a price associated therewith, so that at least some secondary operations might be options to be considered and selected by the consumer as the project order is being finalized.

Finally, it is noted that at least some tasks to be executed in the secondary operations station 308 might be done by the consumer, albeit under supervision of a store employee. Such consumer tasks might be, for example, the accumulation of non wood-based project components, such as fasteners retrieved from the hardware section of the home improvement store, or the identification, selection, and procurement from the paint section of the finishing materials to be applied by the consumer as the project is being assembled outside the store.

In summary, in view of the contents of FIGS. 1-3, the present invention provides an integrated system for an end-to-end consumer project concept, including pricing/costing and manufacture of lumber and composite materials into ready-to-assemble components, as designed to operate in a lumber/building materials retail environment, including options of having a package of project components delivered and assembled on-site. A consumer utilizes a user interface to the system, accessed by the consumer, for example, using an in-store (e.g., on-site) terminal, or remotely, using a remote terminal such as the consumer's home or work computer, via the Internet, or even a mobile device. The consumer interacts with an application program, typically located in a retailer's computer, either physically located in a retail location or at a retailer's central server location, to choose from either one of various preprogrammed menu items, which the consumer can then customize (e.g., by enlarging or shrinking dimensions or otherwise modifying). Alternately, the consumer could select a menu icon indicating that a new custom project is desired, in which case a custom project program will be invoked to permit the consumer to define and design a custom project that can be built according to specified operations using specified materials.

In order to develop an estimated price for the project, the application program will take the consumer's indicated project and derive machine running time (i.e., cycle time) and use this as a first cost estimate. Next, material requirements for the order would be derived and added to the first cost estimate. Additionally, since certain tasks may require form tools (e.g., a new shaping tool head) to be fabricated either on-site or off-site, such customized tooling requirements will also be included in the price. Additional pricing would include price for such options as prefinishing/finishing and/or additional project components, thereby completing the cost estimate for an order. Delivery and/or on-site installation prices could also be presented to the consumer, as options available in the overall price quote. Previously ordered projects, as well as their associated prices, could be stored in the database, for easy price shopping for future customers.

Once the order is placed and paid for, it can be sent via the Internet to a network station to develop plans for completing the intended project. Based on such parameters as project requirements, store capability, material availability in each store (e.g., high-end/low-end material, additional component requirements, etc.), workload for various stores, proximity to the consumer, a work package is assigned to a specific store production cell for fulfilling the order.

The project is then converted into a complete listing of materials, including any components to be ordered/supplied by any special-order merchants or other outside suppliers, and computer instructions for controlling servos and actuators for the two-machine in-store tandem machining system, using modifications of conventional CAD/CAM technology.

Having a listing of necessary in-store stock materials, a store employee will gather these stock materials and sequentially load them into an appropriate one of the two machines, so that the project components can be completed one-by-one. In any of the machining steps, the store employee might be asked to manually change the configurations of tooling on one or both of the two machines. Computer-generated instructions would then position any number of different tools or the work piece, such that, for example, cuts can be made, as well as holes drilled or milling or routing could be executed as required for different project components.

The store employee then removes a finished component and performs any secondary operations procedures, such as sanding or final separation of sheet material components. In the case of components derived from the sheet material, in some projects requiring more precise tooling, sheet components might be returned to the sheet material machine for additional procedures such as a more precise edging procedure. These components could then be returned to the secondary operations section for final sanding.

Labels are then affixed to the components, and, the components are attached to the conveyor belt mechanism to be processed in the prefinishing/finishing section. Finally, the finished components are gathered together in storage staging area, including the procurement of additional components such as fasteners, brackets, etc., and/or components from outside sources such as any special order merchants. The customer can pick up the package of finished project components from the staging area. Alternatively, the package of components can be priced for delivery to the customer's site for final assembly, either by the customer herself, or by a contractor whose services were also included in the project price. The contractor service could also be priced to include having the contractor take care of the extra components from special order merchants.

Figure 4:
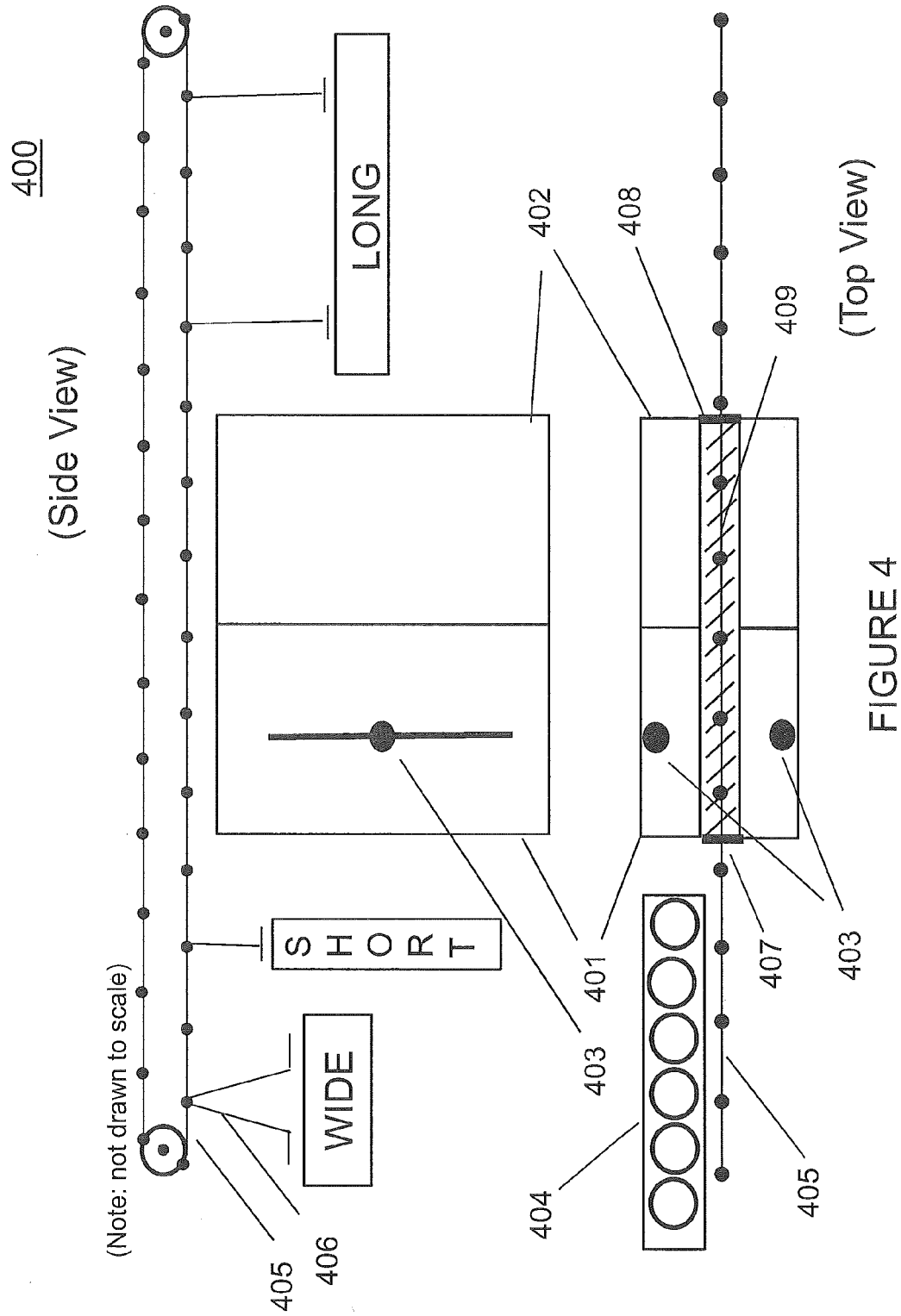
FIG. 4 shows an exemplary embodiment 400 for a pre-finishing/finishing station that can be used either as a finishing stage for project components derived from the integrated system of the present invention or as a standalone profit center for finishing standard off-the-shelf building components, such as pre-hung doors, for which a consumer wishes to change colors.

FIG. 4 shows an exemplary embodiment 400 of the prefinishing/finishing station 212 shown in FIG. 2 and identified in FIG. 3 as labels 309, 310, and its control panel 313. In view of a goal of the present invention to conserve floor space and as shown in FIG. 3, the prefinishing/finishing station 309 is preferably located behind the tandem machine 306, 307, but such location is clearly not essential, as would be understood by one of ordinary skill in the art, particularly in those implementations in specialized manufacturing entities rather than retail environments.

As seen in the schematic representation 400 in FIG. 4, showing a side view at the top of the figure and a top view at the bottom of the figure, key components of the prefinishing/finishing station embodiment 400 include a spraying chamber 401 and drying chamber 402, with sprayer nozzles 403 installed in the spraying chamber 401. Although only two spray nozzles 403 are exemplarily illustrated, this specific configuration is only intended as exemplary, since there could be additional nozzles incorporated in the spraying chamber 401, including a variety of different possible configurations, such as nozzles arranged in vertical line in the middle of the spraying chamber or a first set of vertical nozzles and a second set of vertical nozzles, each set of vertical nozzles possibly being intended to spray a different finishing liquid.

In an exemplary embodiment, the nozzles are also controllable by instruction signals to have spray turned ON/OFF and to have directional control, either by rotating a nozzle position or by activating/deactivating different nozzles pointing in different directions, thereby permitting finish material to be selectively and sufficiently applied to any and all surfaces of project components.

Finishing compounds for the sprayer chamber 401 are dispensed from a paint magazine 404 that stores a variety of paints, varnishes, and other possible finishing compounds.

FIG. 4 also shows a conveyor belt 405 used to transport project components through the spraying chamber 401 and drying chamber 402, and shows how different attachment fittings 406 could be used so that a wide component, a short component, and a long component could exemplarily be attached to the conveyor belt 405, but these attachment details should not be considered as either exhaustive or limiting. The conveyor belt will have markings so that an operator can be instructed by a computer to attach specific project components at specific locations on the conveyor belt, using a specific attachment fitting type and attachment orientation. There will also be a control panel associated with the prefinishing/finishing station 400, typically located at the input end, with possibly another smaller control panel located at the output end, for ease of jogging the conveyor forward as components are removed by the operator after completion of the finish drying process.

Consistent with a goal of the present invention of conserving space, the prefinishing/finishing station 400 is designed to utilize minimal floor space by using a drying chamber 402 as sized in view of using "quick-drying" formulations for finishing compounds, as is well-known in the art of finishing compound formulations. However, such use of quick-drying finishing formulations is clearly not necessary, since the time in the drying chamber 402 can be adjusted based on conveyor speed or by simply leaving the component in the drying chamber 402 for as long as necessary to dry whatever formulation is sprayed onto the component for the finishing process.

In an exemplary embodiment shown in FIG. 4, since the integrated system is preferably envisioned as being installed in a retail environment, a negative pressure is applied to at least the spraying chamber 401 and preferably also to the drying chamber 402, since the two chambers are preferably integrated. Therefore, this exemplary embodiment of FIG. 4 includes rubber sealing flaps 407, 408 at the entrance of the spraying chamber 401 and the exit of the drying chamber 402. It is noted that, for safety and convenience, such sealing flaps 407, 408 would likely be preferred even in those installations when the present invention is incorporated at specialized manufacturing locations rather than retail stores. In an exemplary embodiment, there will also be a flap 409 along the top of the prefinishing/finishing station 400. This top flap 409 will be sufficiently flexible to permit the attachment fittings to slide along as the conveyor moves the article through the station while still providing adequate sealing. No bottom flap is needed if the two sides (i.e., the left side section and the right side section) are jointed together by a bottom used to mount the sides together for structural integrity and strength.

Although FIG. 4 exemplarily shows the prefinishing/finishing station 400 as accommodating the project components derived from wood-based sheet material and dimensional lumber, it should be clear that there is more flexibility possible here, since this prefinishing/finishing station 400 could also paint other project components a color that would match the remaining project components. For example, metal brackets assembled together by the store employee for the project or components received from a special order merchant 207 (see FIG. 2) might also receive, for example, a paint coating so that all project components have a common color or other common finish treatment possible with the prefinishing/finishing station 400.

Operation of the prefinishing/finishing station 400 fits into the integrated system in a straightforward manner. After a project or object is defined by the customer, an option for prefinishing/finishing is offered. If the option is accepted, the customer selects color, material, and sheen for the finish. Pricing is derived as a function of finishing material cost and time, with time potentially being derived by size of the object, assuming that feed rate is fixed.

In the prefinishing/finishing station itself, orienting fasteners are attached to the component and to attachment fixtures on the conveyor chain. If under computer control, the operator will be instructed to attach a specific component using a specific type of attachment to a specific location on the conveyor belt. The conveyor belt, under control of commands from an operator using the control panel or commands from the computer, positions the component inside the spraying shroud where an appropriate moveable nozzle(s) are located to be operated under computer control. The nozzle positions and/or directions are manipulated in the x- and y-planes while applying product, until spraying is completed.

The conveyor repositions the component through the drying chamber. Upon cycle completion, the operator removes the component from the conveyor, removes the orienting fastener(s), possibly applying a label if not already previously applied as each component was removed from the tandem machining system, and then places the completed component in the staging area for customer pickup.

The prefinishing/finishing station should be considered as having been designed so that a component to be finished is placed on the conveyor at a specific location, based on reference marks on the conveyor, and the article to be finished can be moved forward and backward, if required for the specific component, by controlling the conveyor motion, either manually or under computer control. The finishing material is applied by pointing appropriate nozzles in appropriate directions relative to the current location of the article. Thus, for example, painting a door having many panels of glass can be considered as an object with a work path in the spray chamber, with the conveyor sometimes advancing the door and sometimes reversing direction and sometimes changing direction of the spray so that the nozzles might at different times be directed upward or downward or forward or backward relative to the current location of different structural components of the door.

Along this line, it is also noted that more than one layer of finishing material or different color finishes could be applied to an article by moving the article through the spray section and the drying section and then reversing the conveyor belt to bring the article back for another layer of finishing material.

Further, it is noted that the prefinishing/finishing station is also considered as a potential new profit center by itself. That is, many customers might want to buy a standard component such as a metal or wooden door, or a standard window, but wish to change the color or finish. Moreover, some consumer products, such as louvered doors, require considerable effort to do a good job in changing finish because the many small surfaces require meticulous detail that can be difficult to adequately apply a finishing material using a brush. With the present invention, the customer could have the desired finish applied to a standard, off-the-shelf component and leave the store with the standard component finished in the desired color for their unique situation.

This convenience in applying desired finishes for standard, off-the-shelf components is considered new in the art and provides the basis for considering the prefinishing/finishing station of the present invention as a potential profit center on its own merits, by potentially adding value inside the store to inventory items purchased by consumers.

The Two Configurable Machines of the Tandem Machining System

We now turn to details for the two machines of the tandem machining system, operable from a networked or sneaker net (i.e., small, in-store or small area network) CAM command/control software based interface, and that together provide tooling platforms appropriate for average consumer projects envisioned to be accommodated by the present invention, without incurring a high initial tooling cost for elaborate tooling that might be necessary for "high-end" projects beyond the scope of the intent of the present invention. That is, although these two machines are designed to have flexibility by having provisions for different tooling heads to be attached, it is possible that some projects will require capabilities beyond those of the present invention and that would have to be custom-ordered from facilities having a much larger outlay of tools and capabilities.

However, it is also noted that consumers might well prefer to have the tools of the present invention perform their intended functions and then, possibly, ship the components needing specialized treatments to another local provider, realizing that the overall cost of the project would be cheaper if at least part of the fabrication effort is done by the integrated system of the present invention. The integrated system of the present invention will be less expensive for arbitrary consumer projects because its simple design is intended to be sufficiently sturdy to process the standard-sized raw materials used for such projects without using excessive structure needed in larger machines designed for specialized fabrication of, for example, roof trusses or even factory fabricated windows or doors. These specialized fabrication machine systems typically require large and elaborate holding fixtures specially designed for each type of product.

In contrast, the tandem machine system of the present invention is specifically designed to provide a simple system that can efficiently provide tooling operations on standard raw materials used for arbitrary consumer projects, using a structure that is sufficiently sturdy but not excessive in mass, weight, and cost. Because of its simple design, components of the machine system can be easily replaced as normal wear occurs.

Moreover, because of its simple design, it is envisioned that it can be provided in large numbers at retail locations at relatively small cost for an initial investment by a retail chain, thereby contributing to being less expensive for arbitrary consumer projects. Additionally, the smaller consumer price for customized designs results from having raw materials available without additional shipping costs for these materials, as well as having the finished project components available to the consumer without having additional shipping cost, as would be required if the consumer places a custom order to a remote factory location.

As some non-limiting examples, a consumer project might include wood components for one or more components, but there might also be metal, plastic, or other materials used for the overall project that exceeds the capability of the present integrated system, and the consumer wishes to utilize the present invention for the wood components of a table or cabinet and might, for example, approach a glass manufacturer or retailer to supply a glass insert for a door of the cabinet or a glass cover for the table. Similarly, a consumer might use the present invention to cut and form frame components for a window but would obtain glass panes for the window elsewhere, if not available at the local home improvement center. Alternately, of course, some additional capabilities, such as glass component preparation, might be priced out as a secondary operation if the home improvement center has the separate capability to provide such service.

A characteristic shared by these two machines is that they are designed so that the tooling and movement commands can be planned so that operations can be sequentially executed as the stock material moves through different preplanned positions, with perhaps a final cut then being executed to complete the project component and sever it from its original piece of stock material.

Thus, for example, if holes are necessary on both ends of a short project component on the dimensional lumber machine, these holes will be drilled for one end when the stock material is in a position that the drilling at one tool station location, the stock then shifted along the x-axis to make an end cut on that one end. The stock material is then shifted along the negative x-axis to drill holes for the opposite end and then a final cut is executed to sever the component from the stock material. This concept of strategically placing stock material sequentially for different operations and/or performing multiple operations with stock material in one position is similar to the operational concepts utilized in conventional numerical control (NC) and robotic systems.

Another characteristic shared by the two machine architectures of the exemplary embodiment described herein is that they are intentionally designed to keep complexity to a minimum. This exemplary embodiment is therefore a design involving design tradeoffs. Exemplary alternate embodiments are described at the end of this disclosure, but the inventor considers that this exemplary design will be more than adequate for the majority of consumer projects while providing safe and quick response times, including rapid placement of stock material onto the machines, for efficiency of operating the system as a profit center in a retail environment.

Another design characteristic shared by these two machines is that they are designed to easily accommodate standard-size stock commonly found in conventional home improvement centers. However, they have been designed to accommodate larger stock that is special-ordered.

For example, although the standard sheet material is 4'×8', it is possible to order custom sizes of 4'×10' or even 4'×12' sheet material. The sheet machine is sized and designed to permit entry of these larger sheets and adequately support them for cutting, even if the entire length of the non-standard size is not fully supported during any specific stage of processing.

Similarly, the dimensional lumber machine has been sized to adequately support during processing lumber stock longer than 8' and wider than the typical widths of nominal 4", 6", 8", 10", or even 12". In the case of longer pieces, a support can be placed as required at the input and/or output of the dimensional lumber machine to support overhang. Although not particularly well demonstrated in the exemplary overall floor layout of the store production cell demonstrated in FIG. 3, the preferred embodiment of this production cell takes into account the possibility of oversize stock by placing the dimensional machine 307 sufficiently forward so that overhang from oversized dimensional lumber can rest on auxiliary roller support stands on both ends of the dimensional lumber machine 307.

The Dimensional Lumber Machine

Figure 5:
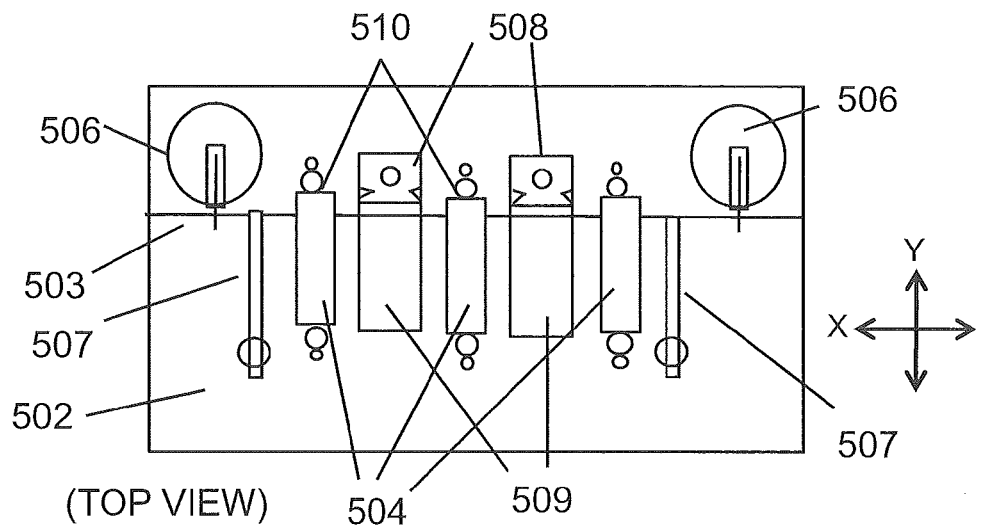
FIG. 5 shows an exemplary embodiment in schematic format 500 for the dimensional materials machine of the tandem machine system.
Figure 5:
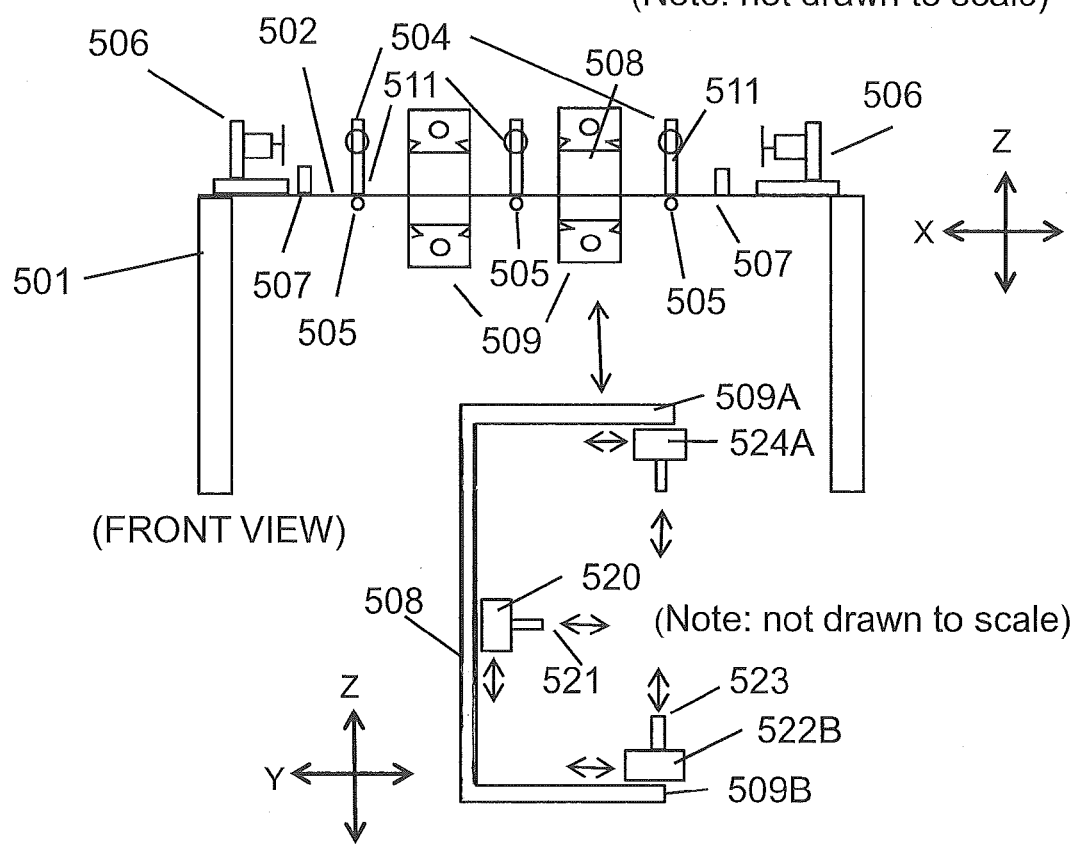

The dimensional lumber machine (or dimensional stock machine) shown exemplarily in schematic format 500 FIG. 5 is designed for operations on dimensional wood stock, such as nominal 2"×4"×8' lumber stock, and larger sizes can be adequately supported and held in place for processing operations, given the clamping and motion capabilities as will be described. FIG. 5 shows both a top view, below which is shown a front view. It is noted that FIG. 5 is intended as a schematic format and is not drawn to scale. Below the front view is also show schematically how the vertical and horizontal ways can accommodate tool heads that can be positioned along the vertical/horizontal ways using servo actuators. The tool head assemblies themselves will incorporate servo-controlled actuators so that the tool can be extended outward to execute tooling operation in a depth direction of the work piece surface.

A primary feature of the dimensional stock machine is a central base 501 which will house components that will serve the following functions:

1) Provide a table surface 502 (i.e., top surface of a table plate) to support a work piece (not shown);

2) Provide support for a fixed fence 503 (e.g., an angle bracket) along its longitudinal axis from which work and feature-producing tooling will be referenced (e.g., "datum A");

3) Provide supports to accept and move vertically at least one manipulating rotor assembly, such as for milling, routing, and drill attachments (not shown, but reference the lower inset of FIG. 5);

4) Provide support for manipulating rollers 504 which will control locations of the work piece along the fence (the three manipulating roller 504 are commonly-controlled);

5) Provide support for idler rollers 505, as embedded in the table top and protruding above the table top surface approximately 0.005", opposite to where manipulating rotor assembly contacts work, that will permit fluidity of movement of work while maintaining positive control of the work piece;

6) Provide support for sawing stations 506 at each end, capable of producing miter and compound miter cuts, fixed in one exemplary embodiment, but on movable carriages in a second exemplary embodiment (the cutting action is due to a chopping action, similar to a manually-operated miter saw, as actuated under servo control);

7) Provide support for pneumatically operated clamping rollers 507 that will secure work to the fence line while allowing work to be moved through required stations; and 8) Provide support for fixed rigid ways (two vertical 508, two upper horizontal 509B, and two lower horizontal 509A) along which will move the rotor assemblies/tooling heads (see lower insert below the front view) in reference to their prescribed axis.

This basic structure provides a fixture that can reference and locate work to a tooling station, so the only thing left is turning on, for example, a saw or drill or milling head, orienting it or the work piece to where it needs to be and have the tool perform its function, perhaps involving a servo control of positioning of the overall tool, such as moving a drill forward, or of components on a tool, such as the angle or tilt of the saw blade on the saw stations. Thus, in the dimensional lumber machine the locations and tool controls can be automated using drive signals to servos that are derived from computer instructions. Alternatively, in an exemplary embodiment, a form of manual mode can be used, a store employee controls positions and tool functions using a control panel associated with the dimensional machine.

In an envisioned typical embodiment, the dimensional machine will be fitted to have a drilling tool on one of the vertical ways and a routing head on the other vertical way. Likewise, there would be a drilling head on one of the horizontal ways and a routing head on the other horizontal way. In this manner, it will be possible to do either a routing or drilling operation from either the horizontal or vertical way without having to install different tooling heads, by simply moving the work piece to the appropriate location for either a routing or drilling operation, in either vertical or horizontal directions. In this manner, a tool docking station can be avoided for the dimensional machine, if all tool heads can be placed somewhere on the machine that can provide the appropriate tooling operation if the work piece is appropriately shifted along the x-axis.

As exemplarily shown in the inset below the front view in FIG. 5 that shows schematically a side view of the vertical/horizontal ways, the vertical way 508 incorporates a lead screw assembly (not shown) that permits the tool head assembly 520 to be positioned vertically anywhere along the vertical way 508. The tool head assembly 520 will include a servo-controlled plunger assembly 521 for pushing the operating tool head outward from the vertical way surface 508 and then retracting the tooling head, as shown by the bidirectional arrow associated with plunger assembly 521. Similarly, the upper and lower horizontal ways 509A, 509B each incorporates a lead screw assembly (not shown) that permits its tool head assembly 522A,522B to move horizontally along the horizontal way 509A,509B and the head assembly has plunger provisions 523 to push/retract the tool head, as indicated by the bidirectional arrow associated with plunger 523.

It is noted that, in some embodiments, the tool head assembly 520,522 could also incorporate one or more mechanism that selectively controls an orientation direction of the tool head operation other than simple vertical/horizontal direction. For example, there could be tilt control capability built into the tool head assemble 520, 522. However, the present invention is primarily concerned only with the lead screw positioning capabilities along the vertical/horizontal ways 508, 509 and the capability to control an amount of extension of the tool head. Specific design features and capabilities of the attached tool assemblies themselves are not so important, since the tandem machine system of the present invention is envisioned as using standard tooling head assemblies that are currently available and well known in the art and the details of controlling the heads depends upon the specific tool head assemblies that are installed.

It is further noted that a "strict" manual control is not considered desirable in preferred embodiments of the present invention for at least two reasons. First, keeping the manual control as a mode available through the operator making position control settings on the control panel clearly improves safety for the operator. Second, having an operator actually operate the tools under strict manual control would require that the tool be disconnected from one or more servo actuators. Although the preferred embodiments will use simple attachments to actuators, it would be simpler and faster to use manual position controls on the control panel rather than take time to disconnect tooling from actuators for manual operations.

As shown in FIG. 5, the listing of primary components of an exemplary embodiment of the dimensional lumber machine is:
  A. Base table 501, which will support all components and provide a surface upon which work will rest during processing.
  B. Manipulating rotor assembly (3) rollers 504, with mechanisms to provide ability to ascend and descend, and using pneumatic pressure to urge the board downward toward the table top surface.
  C. Idler rollers 505 set into the base 502, that each protrudes a minimal amount, for example, 0.005 inches, above the surface of the base, to eliminate friction between the board and the table surface.
  D. Manipulating roller servo control operators 510.
  E. Fence structure 503 that provides a fence line, a surface to which to reference work and from which movable stations produce features, such as drill holes.
  F. Manipulating rotor assembly up/down controlling apparatus 511 (alignment rails and air cylinders).
  G. Compound miter sawing stations 506.
  H. Clamping rollers 507 which use pneumatic pressure to hold a board against the fence structure.
  I. Vertical rigid ways 508 with lead screw (to operate a tooling head, see inset below front view)
  J. Upper and lower horizontal rigid ways 509A,509B with lead screw (to operate a tooling head, see inset below front view).

Operation of the dimensional stock machine in the context of the exemplary embodiment is straightforward, as follows. A work piece (i.e., piece of dimensional lumber to be machined) will be placed on the base table top 502 against the fence line 503 and longitudinally located by either by a mechanical stop or optical (laser) sighting device. Upon initiating a cycle start (e.g., depressing a START button) clamping rollers secure the work to the fixed fence line. The manipulating roller assembly 511 descends until sensors determine contact has been made and appropriate pressure is applied.

Once contact has been made, datum A (i.e., y=0) is established by the fence line, datum B (i.e., z=0) is established by the base (with which manipulating rollers 504 ensure positive contact), and datum C (i.e., x=0) is established by a mechanism that automatically centers the work piece, or the work piece can be jogged to position through a control panel by the operator. The machine then sequentially executes tasks assigned by a program that positions work to appropriate longitudinal positions for specified tooling to carry out its function, until machining for the work piece is complete. The operator then removes the completed work piece from the machine, possibly applies a label, and places it with other project components, possibly for further tooling in the secondary operations area or possible finishing processing in the prefinish/finishing area.

As previously noted, one of the design goals of the present inventor is to provide a dimensional stock machine in which all operational procedures of a specific project component can be executed sequentially as the stock is controlled to be moved along the fence. Thus, for example, if a project component requires a relatively short length, an 8' piece of a 2"×4" might be placed in position against the fence, a first positioning operation would move the piece into position for a cut on the end. A second positioning operation might move the piece into position for a drilling operation. Finally, a third positioning operation might move the piece into position for making a second cut with the same saw station that would sever the component from the 8' stock material but would complete all machining operations for that component being cut off. The remainder of the 8' stock material might then be used for a second component that requires moving the stock material to the second saw station for making cuts and drilling operations.

In the exemplary embodiment described above there are two sawing stations fixed to the base. An advantage of this embodiment is that the design will be easier to produce in numbers. In a variation, the sawing stations are mounted on moveable carriages. An advantage of this variation is that, by spreading out the tooling platforms (sawing stations on moveable carriages), there will be room to easier add capabilities and for similar piece work will permit faster feed rates. A disadvantage of this variation is that it adds complexity and will, therefore, be more costly and require additional, recurring calibration. Another possible variation of each of these two exemplary embodiments is one in which there is only one saw station. However, this variation is not considered desirable since it would require that the stock material be removed and rotated end-to-end to place the second end into position for machining operations.

Other variations are possible. For example, although the exemplary embodiment refers to a "table top base", all that is necessary is a surface upon which the work piece can rest. There is no need to have a contiguous plane of material to form such top working surface, as long as there is sufficient support for the work piece and support for the idler rollers to permit the work piece to adequately supported for movements and for the machining processing. A single plate is used in a preferred exemplary embodiment because it potentially provides better control of tolerances of the positions of the saw heads and the vertical/horizontal ways. Similarly, the various structural components and assemblies, such as the vertical and horizontal ways, the sawing stations, and the various clamps and rollers, could be attached either to a frame of the machine or to the "table top" surface used to support the work piece. However, again, in a preferred exemplary embodiment, a base plate is used because a single plate having pre-drilled mounting holes for attaching the saw heads and vertical/horizontal ways permits better control of tolerances.

The Sheet Cutting/Forming Machine

The second machine of the tandem machine system builds on the sheet cutting machine that now exists in many lumber retailer stores and that permits store employees to cut sheet stock for customers. This conventional sheet cutting machine consists of a backward leaning base with rollers along the bottom upon which the sheet rests, as fixed along the horizontal centerline atop the base. A saw unit is operated along vertical guide rails that are fixed in the top and bottom.

This conventional sheet cutting machine can be operated in two ways: the first way is for making cuts that are perpendicular to the base of the machine. The sheet is rolled along the rollers on the base to the desired position. Then the saw blade is oriented to be perpendicular to the base, the saw is turned on, and the saw unit is pulled downward by the operator, traveling along a guide assembly, thereby producing the cross cut, meaning across the width of the sheet material.

The second way is to orient the saw blade parallel to the bottom rollers and secure the saw unit by a clamping device to guide rails a given distance from bottom rollers. The saw is turned on and the sheet is then pushed along the bottom rollers through the saw, thereby providing a rip cut through the sheet material, meaning a cut that is parallel to the bottom edge of the sheet material.

Figure 6:
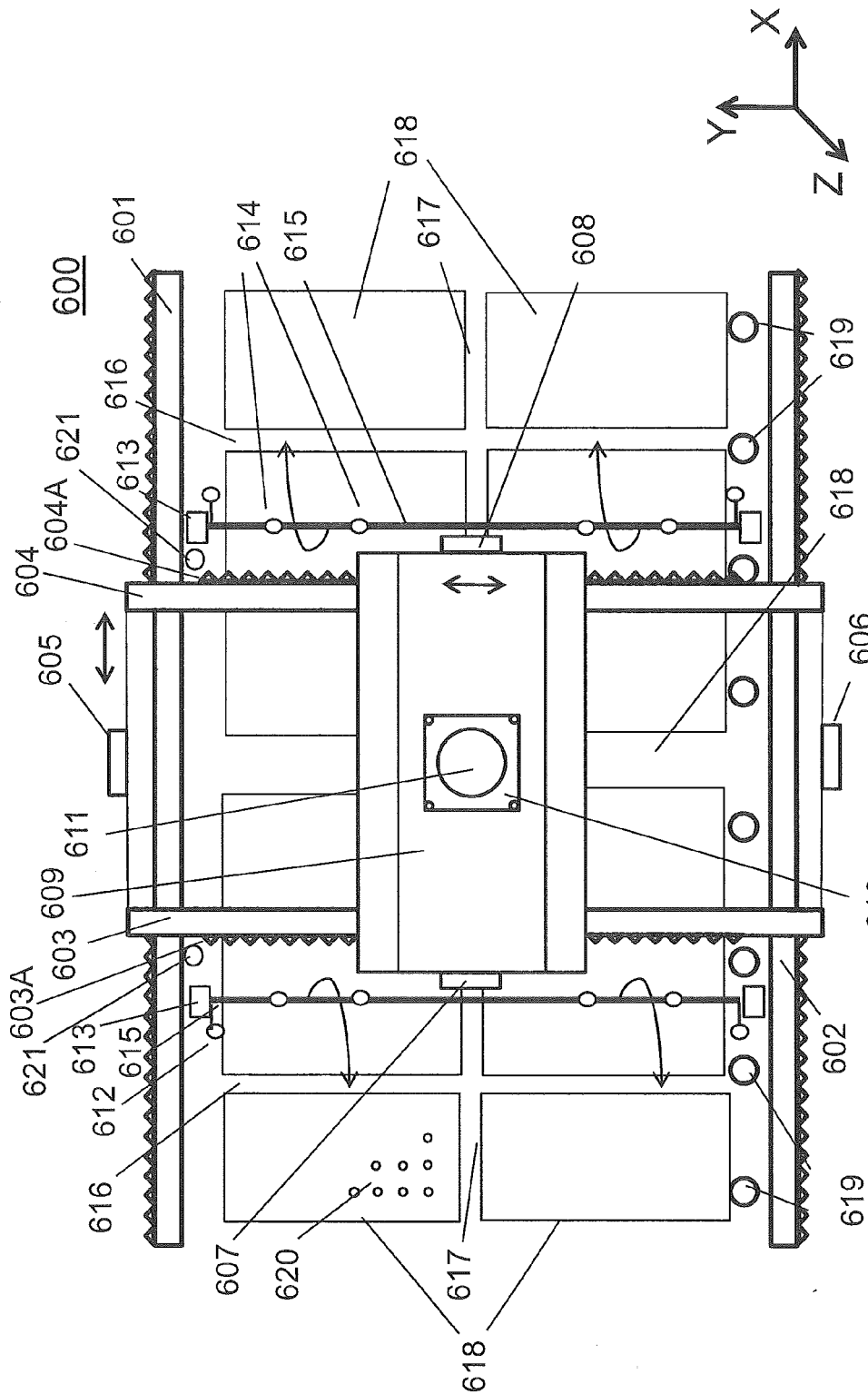
FIG. 6 shows an exemplary embodiment in schematic format 600 of the sheet cutting machine of the tandem machine system.

As shown in schematic format 600 in FIG. 6, the sheet cutting/forming machine of the present invention provides the following additions and modifications to this conventional sheet cutting machine.

In a first primary modification, devices are added that permit the servo-control positioning of the sheet material, as well as servo-control of the positioning and motion of a tooling platform upon which can be mounted a saw head or other tool head drive such as a drill or router bit. These tools and tool heads might also themselves have servo controls. Also added will be mechanical and/or laser optical referencing devices for precise positioning of the sheet material, as is already well known in the art. The tooling platform is a platform attached to the y-axis guide rails by four linear bearing sleeves located at outside corners of the tooling platform (see FIG. 7). The gear rack will meet the pinion gear assembly here. Servo-controlled pinion gearing is attached to the tooling platform. The tooling platform can be operated manually with the y-axis pinion gear disengaged (and y-axis guide rail assembly in the center/home position and locked in x-axis at this centerline position), but, in contrast to the manual mode of the conventional sheet cutting machine, the preferred mode of manual control in the present invention uses operator inputs to position controls on the control panel rather than operator manual control of the saw platform.

Figure 7:
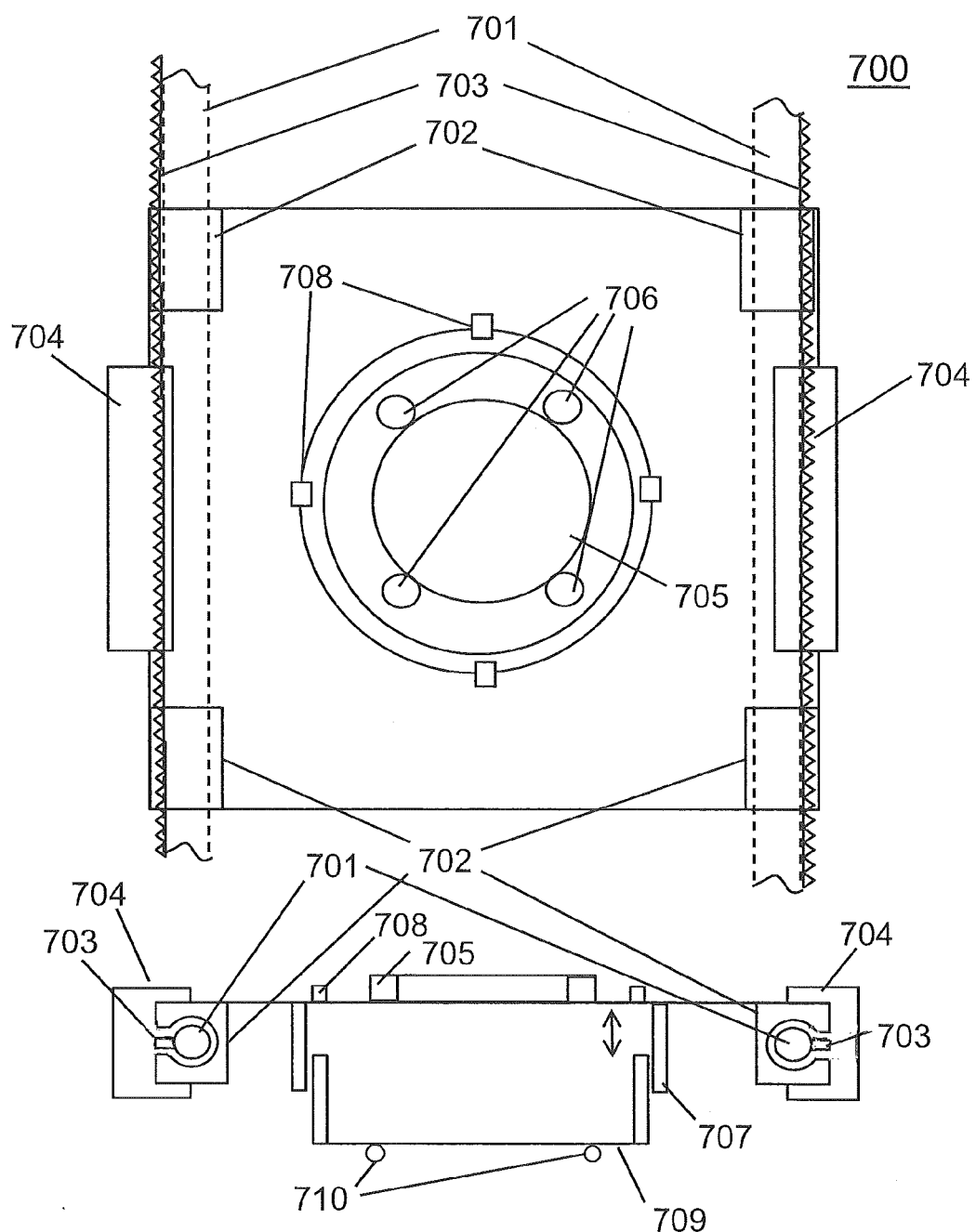
FIG. 7 shows an exemplary embodiment 700 of the tool platform 609 of the sheet cutting machine, including the pressure sensing head used to establish reference to the sheet material work piece.

A pressure plate/sensing assembly is mounted to the underside of the tooling platform, as exemplarily shown in FIG. 7. At the center of the tooling platform is a receiver that will accept a tool (e.g., a saw, router, or drill head). The tooling platform will include a controlled depth-setting apparatus that communicates with the pressure plate sensors, to permit the tool head to be selectively pushed, under servo control, deeper into the sheet material, as exemplarily shown in FIG. 8.

In a second primary modification of the conventional sheet cutting machine, the tooling platform of the present invention will have provisions to interchangeably accept interchangeable tool heads, such as a circular saw head on a rotatable base, a routing tool, and a drill bit, all of which can be set to a controlled depth along the z-axis (of the sheet machine). In the layout schematic 300 of FIG. 3, the tooling docket station 312 is used to store these interchangeable tool heads. The tool heads that can be selectively attached to the tooling platform are envisioned as being standard tool head assemblies already currently available and well known in the art.

Also different from the conventional sheet cutting machine, the tooling platform of the sheet machine of the present invention will travel along servo control guide rails in one of three modes, to be described shortly.

As shown schematically 600 in FIG. 6, the sheet machine of the present invention has the following listing of components:

1. Horizontal guide rail, x-axis upper (601)
2. Horizontal guide rail, x-axis lower (602)
3. Vertical guide rail, y-axis left (603)
4. Vertical guide rail, y-axis right (604) Each guide rail 601-604 has a helical track bearing 601A-604A upon which a pinion gearing will act
5. Pinion gearing assembly, x-axis upper (605)
6. Pinion gearing assembly, x-axis lower (606)
7. Pinion gearing assembly, y-axis left (607)
8. Pinion gearing assembly, y-axis right (608)
9. Movable tooling platform 609
10. Pressure plate sensing assembly 610
11. Receiver 611 for feature producing tools (e.g., circular saw, router, drilling assembly)
12. Two rotating yoke assemblies 612, one left, one right, to press down on the sheet material, when operating in mode two, holding the sheet material work piece flat against the surface of the backing plates 618(A)-618(H), in the second position (not shown), manipulating roller assemblies 612 retracts into the vertical space 616 between the outboard and inboard base plates during mode three operation when project components are affixed to the backing plates 618 using carrier plates (not shown). Holes 620 are drilled in matrix manner on all backing plates 618 to permit pins to be selectively inserted to align the carrier plates (not shown), although only a few of such holes 620 are shown exemplarily in backing plate 618(A). Some of these pin holes 620 can be threaded holes, for permitting clamping fixtures to be screwed into the backing plates 618 for clamping the carrier plates used in mode three operation. Additional screw holes could also be located on structural components located behind the horizontal gap 617 separating the upper and lower backing plates.
13. Servo operators 613 for manipulating rollers 612
14. Rollers 614 that will contact wood, rigidly connected to shaft (614)
15. Shaft 615 connecting servo operator to manipulating rollers
16. Vertical gap 616 between outboard and inboard backing plates 618, to accept the manipulating rotor assembly when not in use in mode three operation. The vertical gap 620 between the inboard backing plates defines the centerline position in the x-y plane. This gap dimension is predetermined so that the circular saw blade can operate for horizontal cuts and is dependent upon the diameter of the saw blade.
17. Horizontal gap 617 between the row of upper backing plates 618(A-D) and the row of lower backing plates 618(E-H) that will receive reference specialized clamping fixtures for mode 3 operation
18. Base plates 618(A)-618(H), mounted to the frame, will serve to support and reference sheet work in the x-y plane
19. Bottom rollers (619) will support and reference work at y=0 in mode 1 and 2 operation and are substantially aligned along the longitudinal axis of the sheet machine
20. Clamping rollers 620 that provide tension to the top edge of the sheet material to prevent the sheet material from migrating upward during cutting in mode 2 operation
21. A rigid, welded tubular steel frame (not shown) supporting entire apparatus approximately 10° off-center In the first mode of operation, the servos are controlled with manual inputs from an operator via control settings on the control panel, to provide a manual mode similar to the manner of operation of the conventional sheet cutting machine. Although the sheet machine of the present invention has been designed so that there will be easy disconnection from the servo actuators, which would provide a strict manual control equivalent to that of the conventional sheet machine, such strict manual control is not a preferred manner to operate the servo-controlled sheet machine of the present invention. Rather, the preferred manual control is provided by having the operator make position settings through the control panel. This mode of manual control is safer for the operator and would be faster and more convenient than disconnecting/reconnecting from servo actuators.

In the second mode of operation, the tool platform is locked to be at the centerline position in the x-axis of the sheet machine and is servo-controlled along the vertical guide rails 603, 604 so that the tool platform moves only in the y-axis. The sheet material is moved in the x-axis under servo control by providing servo input commands to the manipulating rollers 614 on the rotating yoke assemblies 612. Clamping rollers 620 keep the work sheet firmly resting on the bottom rollers 619, thereby firmly maintaining a fixed reference that would be lost should the sheet be allowed to migrate upward during machining operations.

Mode 2 thereby provides an automated version of the conventional sheet cutting machine if it were to be modified to have a tooling platform. Any two-dimensional form can be shaped using mode 2 if a routing head is used for cutting, and mode 2 typically works by leaving the formed shape attached to the sheet material at a number of attachment points, in an operation that is referred to as "stenciling" the desired form. The formed shape will be subsequently severed from the sheet material by the operator, who will roll the entire sheet material into the secondary operations station and use a hand or power saw to cut through the attachment points around the periphery of the formed shape.

If the tooling platform is fitted with a circular saw head, the shape will necessarily be constrained to have linear rectangular cuts to form its outline, since the circular saw blade will not be able to cut curve shapes. Arbitrary two-dimensional curves can be cut in the sheet material using a router head that can be plunged into the sheet material and then would be capable to follow any desired outline shape, with x-axis movements along the outline occurring by moving the sheet material and y-axis movements occurring by moving the tool platform along the two vertical guide rails. It is noted that the corners making abrupt direction changes could serve as mode 2 stencil attach points to be removed by the operator in the secondary operations station.

Mode 2 is faster than mode 3, and mode 2 will be used for the majority of consumer project components, but mode 2 is not as precise as mode 3 operation.

In mode 3 operation, servos are engaged for both the y- and x-axes for the tool platform motion, thereby permitting a two-dimensional movement of the tool platform relative to the sheet material, which is locked in a fixed position on a table-like surface of the fixture. Given the greater precision in movement, including greater precision in depth control, mode 3 might be used as a finishing stage for components previously shaped in the more rapid mode 2 operation, once the stenciled components are severed and then returned to the machine as fixed work pieces. That is, mode 3 could be useful for providing finishing effects on component edges, such as special contours on exposed edges of a component.

The ability to control the depth of tooling on the sheet material will be achieved by using a pressure plate assembly that operates from the underside of the tooling platform, as exemplarily shown in the schematic diagram 700 of FIG. 7. The pressure plate will be controlled to descend, under servo control, until contact has been made with the object being formed. This level of descent will then be communicated to the tooling platform, and the tool head will then be commanded to descend, again under servo control, beyond the pressure plate to the desired depth, thereby permitting tooling execution in the z-axis. A power unit drives the tool head rotation.

The difference in aspect ratios (e.g., length-to-width) of tooling platform 609 schematically shown in FIG. 6 and the exemplary embodiment 700 shown in FIG. 7 should not be considered significant, since the actual dimensions and relative dimensions will depend upon such factors as the specific thickness and material of the tooling platform table as well as the diameter and rigidity of the two vertical guide rails 603,604.

FIG. 7 exemplarily shows the following components.
Two round vertical guide rails 701, which support the tooling platform assembly.
Four guide rail bearing mounts 702, used to slidably affix the tooling platform assembly to the two vertical guide rails 701.
Two rack gearing assemblies 703, one attached to each of the guide rails 701.
Two pinion gearing assemblies 704, one attached to each side of the tooling platform assembly, to interact with the rack gearing for positioning of the tooling platform along the guide rails 701.
A receiver 705 for interchangeable tool head assemblies (exemplarily shown in FIG. 8).
Four locking points 706 for locking the interchangeable tool head assemblies.

A mounting ring 707 for the pressure plate assembly.

Four pressure plate operators 708.

A pressure sensing plate 709.

Four pressure plate roller bearings 710.

In operation, the pressure sensing plate 709 is lowered downward by the pressure plate operators 708 from the surface 711 of the tooling platform until the roller bearings 710 contact the sheet material. This contact surface now provides a datum reference for controlling the depth of the tool head relative to the surface of the sheet material.

Figure 8:
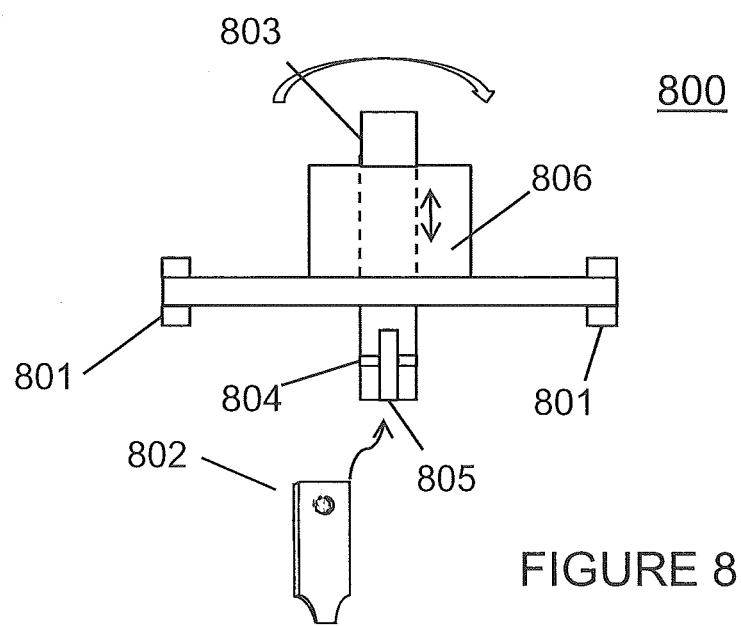
FIG. 8 shows an exemplary power tool attachment 800 that fits onto a tool head attachment fitting of the tooling platform and that has a slotted drive element 803 to accept edge contour tools 802 that can be arbitrarily customized for a consumer project.

FIG. 8 demonstrates schematically 800 an exemplary tool attachment in which the cutting tool head assembly is formed as a collet with a slot 805 into which slot 805 is slipped the cutting tool head 802 that has been machined to have a mirror image of a desired contour. The cutting tool head 802 can be affixed to the collet using a bolt or a pin mechanism sized to fit into the hole 804 of the collet. This configuration 800 of a cutting tool assembly has the advantage that the cutting tool head 802 can be easily machined locally to accommodate any arbitrary edge contour that a consumer might want.

Drive unit 803 provides power to rotate the tool head, as well as actuators to control the depth of the tool head relative to the wood sheet. Attachment fittings 801 permit the assembly 800 to be interchangeably installed on the receiver of the tooling platform.

Manipulating the tooling platform to carry out tasks either in y-axis only or both x- and y-axes concurrently can be accomplished using servo-controlled linear actuators. As a non-limiting example, a rack and pinion linear actuator is used, wherein a rotatable pinion gear can be attached to the tooling platform, the pinion gear having teeth which engage to teeth on a rack, which is a linear "gear bar" that is attached to guide rails on the machine. As the pinion gear rotates under servo control, the tooling platform will be moved along the guide rails as the pinion gear teeth engage corresponding teeth along the rack. Other servo-controlled linear actuation methods could also be used.

In modes one and two, the guide rail assembly for the y-axis will be connected to the guide rail assembly that defines the x-axis. In mode two, the guide rail assembly for the y-axis remains fixed along the centerline of the x-axis. When operating in mode three, the sheet is fixed and the tooling platform is manipulated in both x- and y-axes concurrently. By disengaging the pinion gears in the x-axis and y-axis, and the assembly locked in the center home position, with circular saw attached to a platform, the sheet cutting/forming machine can be operated exactly as it is now in the conventional machine, in complete manual operation, although this is not a preferred mechanism for manual operation in the present invention.

When operating in Mode 2, in which the tooling platform operates along the y-axis only, to manipulate the sheet good along the x-axis, a retractable servo-controlled roller assembly will be drawn in from both sides, outside of the field of processing or from beneath tooling plate, on a rotating yoke assembly to within a clearance distance of the tooling platform, so as not interfere with the latitudinal travel of the tooling platform. To secure the sheet material for maneuvering, the roller assembly of the yoke assembly will then be pressed until contact is made to the sheet good, so that the sheet good will be forced against idler roller set into the base opposite the manipulating rollers of the yoke assembly. This positive contact will permit servo control rollers to fluidly manipulate the sheet good in the x-axis while the tooling platform remains fixed or operates in the y-axis concurrently In Mode 3, the tooling platform can be controlled to move in both x- and y-axes concurrently. The sheet good is fixed to the base plate structure, using clamps that can be screwed selectively into threaded holes in portions of the base plate, to establish a known reference location. The tooling platform is then servo-directed along a prescribed tooling path, using servo-control pinion gearing acting concurrently on rack gearing attached to guide rails with both the x-axis and y-axis, thereby allowing any desired two-dimensional tooling path to be completed under computer control.

When the tooling platform operates along only the y-axis (Mode 2), the sheet good will be referenced to the centerline (datum A) of the machine, using the manipulating rotor assembly to "jog" (e.g., move rapidly) the sheet good to this reference position. Datum B is established by the distance from the bottom rollers upon which the sheet rests. This mechanical self centering mechanism can use any sensing mechanism, but, in an exemplary embodiment, a laser sighting device is attached to the tooling platform, and the sheet good job is positioned by the manipulating rotor assembly.

When the tooling platform operates in x- and y-axes concurrently (Mode 3), the sheet good will be rigidly affixed to tooling plate directly, using threaded fasteners or by using specialized clamping fixtures attached to the tooling plate, using threaded holes located on the surface of the tooling plate to clamp the work piece flat against the machine plate or carrier plate. The field of the tooling plate will contain a grid of threaded holes for this purpose. Interspersed with these threaded holes will be indexing holes to accept locating pins used to locate either sheet good or clamping fixtures. Several areas of the tooling plate will be recessed or relieved, allowing edge milling tools to quickly perform repetitive, single, and profiling operations and drilling tests.

For uncommon and irregular shapes and whenever tooling must descend beyond the sheet material (such as for drilling through holes), a soft layer such as Masonite will be placed between product being formed and the tooling plate so as to minimize/eliminate contact between link and tooling place.

The Tooling Platform

The base of the tooling platform is attached to the y-axis guide rails by four linear bearing sleeves located at outside corners of the tooling platform, and a gear rack will meet a pinion gear assembly here, with servo-controlled pinion gearing attached to the tooling platform.

The tooling platform can be operated manually with the y-axis pinion gear disengaged, and the Y-axis guide rail assembly in the center/home position and locked in the x-axis.

Pressure Plate/Sensing Assembly

Mounted on the underside of the tooling platform is a pressure plate/sensing assembly 700, exemplarily shown in FIG. 7. In this embodiment 700 there are two servo-controlled mechanisms (e.g., one on each side) for controlling y-axis travel of the tooling platform assembly. There is a bearing surface at each of the four corners, each being a ball bearing 710. The pressure plate descends until the ball bearings contact the sheet good, as determined by measuring pressure.

A concentric attachment point accepts different tooling. The saw tool attachment will be at a fixed depth, but the drilling and routing tools need the capability to travel to a controlled depth.

Operation of the sheet machine is straightforward, as follows. The operator initially activates a switch on the control panel to place the rotating yoke assemblies into the open position and then slides a sheet of material into the machine, along the rollers at the bottom, similar to the conventional sheet cutting machine. The rotating yoke assemblies are then switched into the compression position, thereby pressing the sheet against the base plates. The operator then either provides manual inputs for mode 1 operation or switches to computer control for mode 2 operation. When cutting is completed the operator will press a switch to release the rotating yoke assemblies so that the sheet can be rolled out of the sheet cutting machine into the secondary operations area.

Exemplary Hardware Implementation

Figure 9:
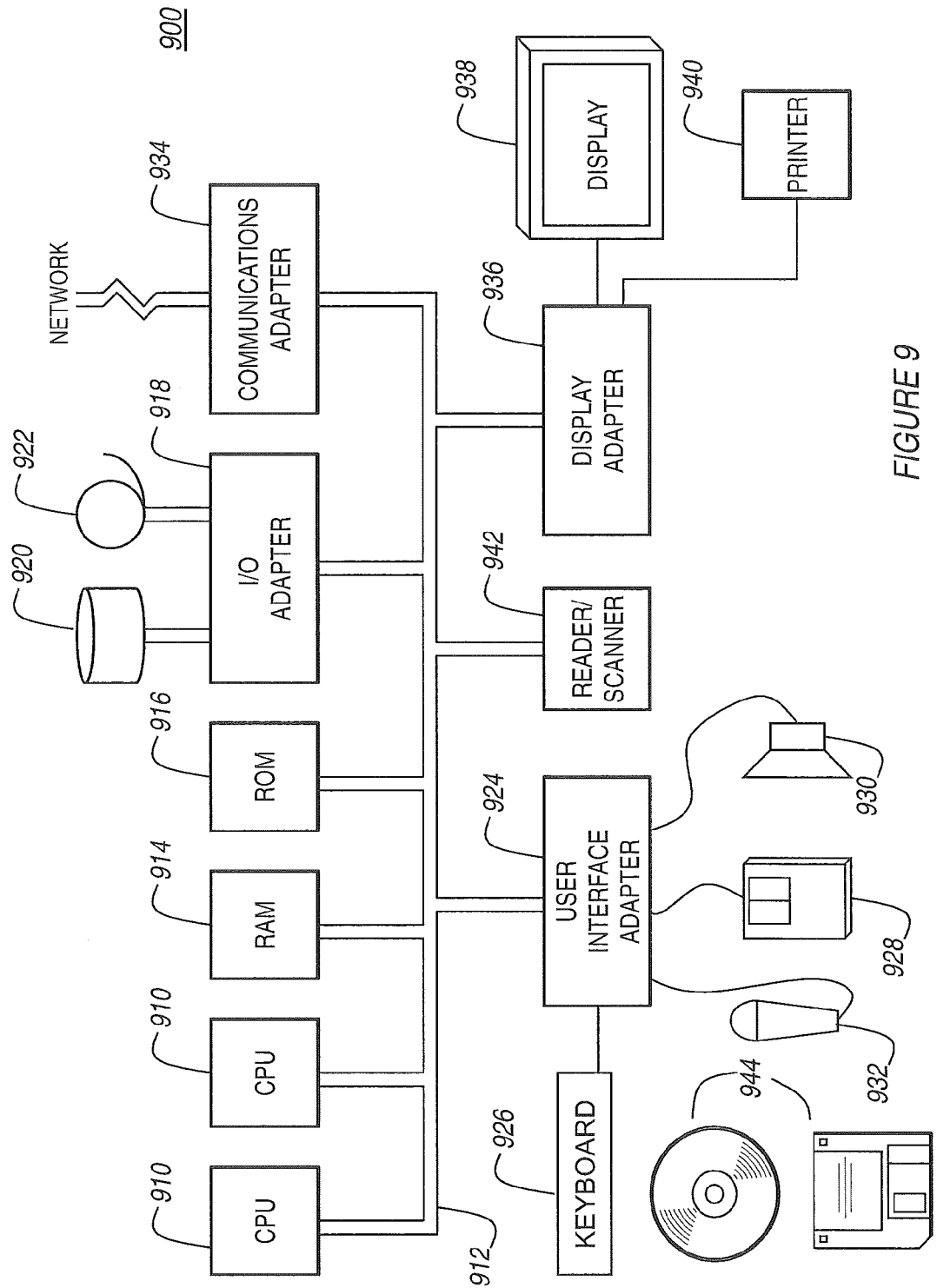
FIG. 9 illustrates an exemplary hardware/information handling system 900 for incorporating aspects of the present invention therein, including exemplary non-transitory storage media 944 (e.g., storage media or computer program products) for storing steps of a program of a method according to the present invention.

FIG. 9 illustrates a typical hardware configuration of an information handling/computer system into which methods of the present invention could be implemented and which preferably has at least one processor or central processing unit (CPU) 910.

The CPUs 910 are interconnected via a system bus 912 to a random access memory (RAM) 914, read-only memory (ROM) 916, input/output (I/O) adapter 918 (for connecting peripheral devices such as disk units 920 and tape drives 922 to the bus 912), user interface adapter 924 (for connecting a keyboard 926, mouse 928, speaker 930, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 940 (e.g., a digital printer or the like). A reader/scanner 942 could also provide input data onto bus 912.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media, where "signal-bearing" refers to the functionality between the stored instructions and the digital apparatus.

Thus, this aspect of the present invention is directed to a programmed product, comprising non-transitory, signal-bearing storage media tangibly embodying a program of machine-readable instructions executable by a digital data processor incorporating the CPU 910 and hardware above, to perform the methods of the invention.

This non-transitory, signal-bearing storage media may include, for example, a RAM 914 associated with the CPU 910, as represented by the fast-access storage for example. Alternatively, the instructions may be contained in other storage media, such as data storage diskettes 944, directly or indirectly accessible by the CPU 910.

Whether contained in a diskette 944, the computer/CPU 910, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable non-transitory, signal-bearing storage media. In an illustrative embodiment of the invention, the machine-readable instructions may comprise software object code.

Examples of Deliverables for Entire Projects and Individual Components

Following are several non-limiting examples of potential scenarios that demonstrate the features and operation of the integrated system of the present invention.

Starting with either an inter-operable CAD software or through a mobile app portal into the proprietary system CAD/CAM software, a completed design can be reached, including a breakdown of all component pieces with their design specifications. Once the design is finalized and prior to the order being placed, a feasibility check is performed to ensure that all design elements are within the capabilities of the system. For example, this feasibility check would provide a sanity check on a potential design and would, for example, detect that the system would not be able to deliver a shelf that is 30 feet long, 18 inches wide, and 6 inches thick.

Example 1: Customer Projects and Workflows

1. A customer enters the integrated system portal, either in a retail store or online via a home computer or mobile app, looking for a shed for backyard storage. The customer selects a template icon directed to existing designs in the database for small building designs. Upon selecting a design, he then selects icons permitting him to re-size the template product as desired by expanding/shrinking dimensions for length and/or width, with roof pitch unchanged. He then chooses icons for options for level of completion. The customer then decides to add one more window to the template design and adds a shelving layout to accommodate special storage requirements, and selects pre-finishing options, as well a delivery and assembly options.

When the customer selects the PRICE menu icon, the system then generates a price quote, along with lead time for completion, taking into consideration the time that will take into consideration the time to gather all required items requiring custom tooling and special order merchandise, as well as workload at the particular store and actual production time and delivery scheduling.

The system calculates the cost by taking into account the store pricing for: 1) Stock raw materials; 2) Stock finished goods, as well as all other required items necessary to complete the project; 3) Machine running/cycle time to produce all required components to the customer's specification; 4) Custom tooling, if required; 5) Special order merchandise, if required; and 6) Additional options selected by the customer for pre-finishing, delivery, installation, etc.

Upon receiving the price and lead time quotes, the customer then decides whether to proceed by selecting the ORDER icon, thereby placing the order. The system then provides the opportunity to pay for the order.

The store receives the order, and the following steps occur for this order: 1) Drawing from customized templates, machine-readable instructions are generated by the CAD/CAM software and sent to the production cell computer memory, for fulfillment in the next available time slot; 2) An automatic, electronic order is placed for special-order merchandise and/or custom tooling; 3) When the designated time slot arrives, an operator receives a listing of materials and retrieves all required stock merchandise from inventory shelves, typically either by loading a trolley cart with stock identified by a printout or by sequentially bringing each piece to the production cell as it is identified in sequence; and 4) Based on interactions between the operator and the computer controlling the production cell machines, typically using a display panel adjacent to or part of the control panel, the raw stock is loaded sequentially by the operator onto the appropriate machine.

The operator may have to jog the component into a known datum position or, once the operator hits a "READY" switch on the control panel, the machine can be instructed to automatically position the work piece, and then proceeds to execute the appropriate machining instructions by sending commands to servos. Upon completion machining for each project component, the production cell computer provides a label and instruction to the operator to affix that label to the component.

For this shed project, the production cell computer displays instructions for the operator to load the components onto the prefinishing/finishing station conveyor such that all sheathing components are painted red, all exterior trim components are painted white, all floor sheathing components are painted gray, and the pre-hung door unit (stock merchandise) is painted white to match the trim. The production cell computer could display instructions to the operator to proceed with painting the pre-hung door even before any stock is loaded on the tandem machine system. The window units could also receive paint if not already white.

All project components are assembled on a pallet to form a complete work package, including all formed wood components, the pre-hung door, window units, along with joist hangers and fasteners. Instructions for assembly are printed out and included in the package, now ready for shipment.

A company under contract to the retail store for delivery will then pick up the completed package and deliver it to the customer's home. A company under contract to the retail store for installation (possibly the same entity as providing delivery service) will then assemble the shed per the instructions sheet.

2. Assume that a consumer sees a home workstation at a furniture store and likes many of the features that the particular design offers. However, due to her space limitations, this commercially-available piece is not an option since it is not offered in a size she requires, and it is quite expensive. Having heard from her neighbor about the capabilities of the integrated system of the present invention, she decides to visit a local retail store that has implemented the present invention.

Sitting at a kiosk with a sales associate who guides here through all of the options she was looking for, as well as some that she had not considered, the consumer chooses a final design. Among the options she chooses are pre-finishing, delivery, and assembly in her home and the lead time estimate indicated that the unit could be installed the very next day. Moreover, this complete package is quoted at a price that is a fraction of the cost of the "cookie cutter" designs being offered at the other retailer.

The in-store execution is similar to Example 1 above, except that the selected materials for this workstation uses ¾" cabinet grade plywood, which the operator loads into the sheet goods machine. The operator then places a routing head attachment with a ¾" diameter end bit into the tool platform, using simple push pins to click it into place. The operator then presses the cycle start switch, initiating mode 2 operation of the sheet goods machine. The desired two-dimensional shapes required for the workstation are machined automatically, using the stencil-like procedure by which attachment points keep the shape attached to the sheet material. As described above, in mode 2, the sheet machine will shift the sheet material along the rollers supporting the sheet material, using servo-controlled manipulating rollers to thereby provide movements in the x-axis, and the tooling platform will be servo-controlled along the centerline of the machine, to provide movements in the y-axis.

Once all forms on a 4'×8' sheet are routed out by the router attachment tool, either the computer will automatically deactivate the rotating yoke assemblies or the operator can manually deactivate the rotating yoke assembly, thereby the 4'×8' sheet is released. The operator then manually pushes the sheet material out of the sheet machine and into the secondary operation station, along rollers and a track that extend from the sheet machine for this reason. Alternatively, the rotating yoke assemblies could be used to automatically roll the sheet material out into the secondary operations station. In the secondary operations station, the operator uses a portable jig saw to sever the attachment points, thereby severing the stenciled project components from the sheet material.

Since the consumer's selected workstation includes some pieces that require special contour milling for finished edges, these components are then reloaded onto the sheet machine for mode 3 processing, using one or more carrier plates having holes in a matrix or pattern into which holes locating pins can be selectively inserted so that the component pieces can be secured to the carrier without shifting. The carrier plates also incorporate threaded holes into which special clamp fixtures can be screwed so that the component pieces can be securely clamped against the carrier plate(s).

The operator then follows instructions from the computer to replace the routing bit used in the mode 2 processing with the desired form profiling tool. The carrier plate(s) with the project pieces are then attached to the sheet machine backing plates in referenced locations. The operator then presses cycle start to initiate mode 3 using the form tool. The mode 3 processing then proceeds under computer commands to move the tool platform in a two-dimensional pattern to cause the desired form profiling tool to traverse the edges that will receive the special contour shape.

Upon completion of the mode 3 processing, the operator removes the carrier plate(s) from the sheet machine backing plates, removes the completed project components from the carrier plate(s), and attaches orienting fasteners to each component and attaches them to the prefinishing/finishing conveyor belt so that the desired finish can be applied.

The operator then attaches labels to the finished components, prints out the assembly instructions, completes the work package in the designated area for installer pickup, and updates the order status as a completed project.

3. Assume that a customer desires as a project a six-side backyard gazebo with a raised deck and is partially sheltered. This design is 12 feet wide and 19 feet high at the peak. To produce this project would require the following raw materials (lumber) to be formed into ready-to-assemble components:

a. The framing structure includes 2×4's, 2×6's, and 4×4's, cut to size and shape, including notching, specialized angular cuts, and holes drilled for hardware, including fasteners;

b. Sheathing for the upper and lower segments of the shelter portion, as custom-cut to fit the design profile;

c. Sheathing for the roofing and fascia, as custom-cut to the design profile; and d. Railings and decorative balusters.

Once the customer finalizes the project design, the system will then produce a list of all of the required materials.

During fabrication, upon completion of each component, a label will be produced and affixed by the operator.

Upon completion of the fabrication of all components, an instruction sheet will be printed based on these labels. All fabricated wood-based components and all non-wood components such as brackets and fasteners are then assembled as a package ready for the customer to pick up. If the balusters are to be formed by turning on a lathe, a special merchant order is placed electronically to a local woodworking shop who has a contract to provide wood turning services for consumer projects.

4. A consumer homeowner wants a bookshelf configured to fit a confined space in her living room. The consumer, at home, enters the integrated system of the present invention, using an online CAD/CAM portal. She selects the option for a template for a modular bookshelf and enters the desired sizing data and configuration. In the template design, the shelf units are built as stand-alone units, but, for stability, the top is shaped out of a single piece that also unifies the design. The consumer also selects a decorative edge casing that matches the casing that is used throughout the house, and a special edge contour tool head has to be included as part of the project price. At this point, the system interface also offers pre-finishing, delivery, and various levels of assembly as options.

5. Picture framing, for any size. By entering the picture size and the border style (including matting), a consumer can obtain a price quote that can be generated to include custom size cut class and hanging hardware. Some components, such as matting and glass might be supplied by a special-order merchant, and the consumer might place the order through a framing shop, which serves as a special-order merchant to place an order on-line for the wood-based components and serves as the contractor to assemble the finished frame project to be picked up by the consumer at the framing shop.

6. Moldings for shadow boxes, crown molding, chair rails, etc., can be selected, priced out, and custom-cut according to customer-supplied specifications. The price will include the cost of molding and pre-painting options. The specification could require that a new edge cutting tool head be fabricated for the specified contour, and local fabrication of this cutting tool would be included in the price quote, thereby providing the customer the option of having a customized contour or, if the price is too high, selecting a standard contour that is close enough and may keep the project cost a bit lower.

7. At a home improvement retail store, software is made available for pricing of deck designs to make a deck of a certain size with certain features. The tool automatically produces a materials and hardware list, complete with pricing information. A CAD/CAM software package could then generate machine instructions for fabricating the components. If these two systems were to be integrated, the store could also price out the cutting of all the components to size as well.

8. Workbenches and tool cabinets could be offered, custom-sized to conform to available space, with tool holding cabinetry designed and fabricated to use workspace in a manner most suitable for a customer, including specialized built-in provisions for tool such as a vise or drill press.

9. A store could offer the ability to replicate a component of a wooden object that has been damaged.

10. Home workstations, including desk and cabinetry, could be custom designed for optimum use of available space.

11. Wooden patio furniture could be offered, as scaled to conform to surroundings, unified throughout with design features such as common edge milling profiles, engravings, etc.

12. Custom closet storage systems could be offered, including shoe cubbies, shelving, and cabinetry.

Example 2: Professional Contractor

A contractor might be on site with a potential client discussing a project such as, for example, a six-sided, partially-enclosed gazebo with built-in bench seating. Using a contractor version of a mobile app for the system user interface, the contractor can develop on site and with the customer's inputs, a virtual design including discussions on potential alternative designs and/or parameters such as size.

The contractor initially starts by selecting a basic template, using menu selections, and then uses the menu to select a size and approximate configuration. Using on-screen icons, options/features are added or deleted until arriving at the desired object in its finished state.

At this point, the system software performs a feasibility check. If no feasibility problems are found, the system calculates the costs for production of the design, as follows:
1. Price for all raw lumber, of the selected species of lumber;
2. Price for all other (e.g., non-lumber) associated items required for completion, such as fasteners, brackets, roofing material, etc.;
3. Price for machine running (cycle) time produce all wood-based components contained in the design;
4. Price for pre-finishing all components (if that option is selected);
5. Price for delivery of completed work package to jobsite (if that option is selected); and
6. Price for assembly (if that option is selected).

The pricing data can be displayed as broken down, so that the client can decide how many options would be desirable. This pricing data will encompass the material aspect of this project, including lead time estimates. The system will also generate an estimate for the man hours necessary for assembly (that the contractor can adjust up or down, based on his experience).

The quote is now complete and contains a complete breakdown cost as well as scale drawings and can be sent via email to customer for final consideration.

Versions of the app used to enter the system are tiered for capability and for complexity of options offered.

Example 3: For the Store Receiving the Order

Once a store receives payment for quote, a lead time estimate is generated. The design is implemented, including generation of the machine instruction sets, and in store activity occurs, as follows:
1. All materials required for fulfillment are pulled from stock and placed in a pre-production area;
2. Machine-readable instructions are transmitted to the production cell;
3. A special order is placed for all non-stock items, if any; and
4. An operator loads stock material into the production machines sequentially, per instructions as generated for the order.

In conclusion, although the system and method described herein may not be able to compete with feed rates of dedicated factory equipment, such factory equipment is much larger, more expensive, and more complex. Moreover, these factory machines that have been specifically designed for manufacture of a specific type of product.

In contrast, as should be clear from the above examples, the present invention provides an integrated system that is flexible and has configurability that is capable of producing the widest possible variety of features and arbitrary consumer projects, using a confined space. Thus, unlike the dedicated factory equipment, the present invention is intended to provide a convenient method for consumers to easily design and implement any arbitrary project and to have it available locally.

Moreover, the dedicated factory equipment is implemented in an isolated/remote environment to which raw materials must be specifically shipped and then the finished product shipped to another location for distribution. In contrast, the present invention is ideally implemented in a home improvement center that has raw material readily available as well as direct contact with the consumer who has placed an order for whatever arbitrary, custom-designed product the consumer had in mind. There are no additional shipping charges for raw materials and the consumer can avoid delivery shipment charges by picking up the project himself.

Relative to benefits for store owners, this system is envisioned as having a place in local stores, such as home improvement stores, and permits these stores to offer product lines that they do not currently have because of cost and space constraints. By providing goods in the manner described herein, these stores will be able to capture market share from entities that sell only finished goods. Moreover, the present invention has been conceived and designed to build upon existing infrastructure in home improvement stores, such as computer networks and lumber aisles configured to accommodate legacy saw fixtures, so that implementation costs per store would be relative minor. Compared to dedicated factory equipment, the integrated system of the present invention is also designed to have simple and less expensive construction, with components that can be easily maintained and replaced, particularly as the system becomes mass produced for one or more large retail store chains.

Once the present invention is in place, the space occupied now by manual (legacy) machinery primarily for customer convenience will become profit centers for that store. Moreover, by possessing the capability to actually produce "to-specification" components for installation projects in-house, reliance on outside vendors for this service will be reduced, thereby reducing their role with higher proportion of revenue to remain with the store, while simultaneously allowing for better overall project management by both the store owner and the consuming public.

Moreover, since it is conceivable that many work packages will contain at least some short pieces, stock merchandise that would otherwise be discarded as unusable due to warpage, a continuous problem, could now be utilized since the amount of deformation over shorter spans would be negligible for shorter project components.

Relative to contractors, the present invention would provide the ability to quote and/or bid on jobs more efficiently, since it would provide a contractor a database upon which they can draw, using design templates which can be modified to conform to many project requirements.

Moreover, for contractors, the present invention provides tooling for components so that both the cost of completion and job site fabrication can be reduced, since all component pieces can be fabricated in-store and placed in a staging area for customer pickup, even when accommodating custom design specifications.

This feature of the present invention also provides the benefit to contractors of eliminating waste from job site inaccuracies and other human errors. By bringing finished components to the job site, project clean up time will be reduced and jobsites will no longer have to deal with remnants of raw lumber, such as cutoffs and sawdust.

Contractors would also benefit because the skill level requirements for jobs would be reduced, since many aspects of construction projects would be reduced to assembly of prefabricated components, with an instruction sheet being provided for the project. Thus, many projects will have a reduced number of man-hour requirements for completion, so that smaller crews with less experience can potentially have greater productivity. Moreover, by reducing the scope of work actually required to be done at a job site, less materials will have to be delivered and less equipment such as saws, sawhorses, generators, etc., will be required.

The present invention also provides many benefits for retail consumers. First, the present invention will make it possible for the average consumer to complete projects that they would otherwise not contemplate. Moreover, the consumer will be able to evaluate cost and time frames for fabrication of many envisioned projects, including comparisons of possible alternatives.

The present invention also would permit consumers to design, cost out, and fabricate components for repair of existing objects and structures. Using a mobile app, a consumer would be able to compare pricing of a finished project viewed elsewhere, with the added ability to customize attributes of the project being viewed and considered for purchase.

Moreover, since many consumers have no desire to own or experience with operating woodworking tools, the present invention eliminates this tooling requirement for such consumers, and they too can enjoy designing and implementing wood-based projects without a large investment in costs and time for tooling.

Consumers also would benefit by having a mechanism by which they can utilize to make more informed decisions when evaluating proposals from contractors for various projects. And because the present invention provides flexibility in design, consumers will save time by having all component pieces for a given project pre-formed and pre-finished to their potentially-customized specifications, along with any associated hardware, all of which can be ready for pickup per a single order and schedule.

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

Having thus described my invention, what I claim as new and desire to secure by Letters Patent is as follows:

1. An integrated system for fabricating components for a customer's selected wood-based project, said system comprising:
   at least one computer for providing an interface with a consumer to input inquiries and design choices directed to a project having at least one component to be machined in a tandem machine system in which a wood-based project component can be fabricated, regardless whether the component is based on dimensional stock or on sheet material stock, said customer interacting with either a database showing previously-designed projects for implementation using said tandem machine or a CAD (Computer Aided Design) module to develop a new project or a modification of a project in said database; and said tandem machine system, as comprising:

a first machine for executing machining requirements for wood-based sheet stock; and a second machine for executing machining requirements for dimensional wood stock, wherein, upon a final selection by the customer of an existing previously-designed project, a new project, or a modification of an existing project in said database, said system further selectively provides a set of instructions via the CAD module;

wherein the first machine and the second machine are selectively controlled via the set of instructions for cutting, shaping, and forming of wooden components for said tandem machine system to fabricate the customer's final selection, thereby providing an end-to-end integrated system that is completely integrated to selectively permit the customer to consider different options for an intended project and to have all wood-based components of the intended project fabricated and ready to be picked up at a specific location, and wherein said first machine comprises:

a support frame;

a plurality of backing plates supported by said support frame, said plurality of backing plates being supported to be slightly backward leaning;

a plurality of rollers along a base of said first machine, upon which a sheet of material can slide substantially along a longitudinal axis of said first machine;

a plurality of clamping rollers along a top of said first machine, for clamping said sheet of material firmly to said plurality of rollers along the base;

at least two rotating yoke assemblies that can be selectively rotated into a position to hold said sheet of material against said backing plates;

an upper horizontal guide rail and a lower horizontal guide rail, each mounted on said support frame substantially along said longitudinal axis;

at least two vertical guide rails, interconnected together and movably attached between said upper and lower horizontal guide rails; and a moveable tooling platform movably attached to said at least two vertical guide rails, wherein each of said rotating yoke assemblies comprises servo-controlled manipulator rollers for selectively moving said sheet material along said plurality of rollers in either a forward direction or a reverse direction, wherein said moveable tooling platform is selectively movable in a direction perpendicular to said longitudinal axis, along said at least two vertical guide rails, using servo-controlled actuators, and wherein said at least two vertical guide rails is selectively movable as a unit along said longitudinal axis, along said upper and lower horizontal guide rails, using servo-controlled actuators.

2. The integrated system of claim 1, wherein said tandem machine system further comprises a control panel for each of said first machine and said second machine, and wherein each of said first machine and said second machine can be operated under a manual control using operator inputs via said control panels or can be operated under an automated control using control signals received from a computer.

3. The system of claim 1, wherein said tooling platform is configured so that different tooling heads can be selectively installed thereon.

4. The system of claim 1, said second machine comprising:

a frame supporting a surface upon which can be supported a piece of dimensional lumber;

a fence attached to at least one of said surface and said frame, along which fence said piece of dimensional lumber can slide on said surface along a longitudinal direction of said machine, in either a forward direction or a reverse direction;

at least one clamping roller, for holding said piece of dimensional lumber against said fence;

at least one servo-controlled manipulating roller to selectively drive said piece of dimensional lumber along said fence in said longitudinal direction; and at least one sawing station, each said sawing station configured to drive a circular saw blade to selectively make cuts, under servo control, on said piece of dimensional lumber.

5. The system of claim 4, wherein said second machine further comprises:

at least one fixed rigid vertical way, each said fixed rigid vertical way attached to at least one of said frame and said surface and configured to selectively position a tooling head along a length of said fixed rigid vertical way, under servo control; and at least one fixed rigid horizontal way, each said fixed rigid horizontal way attached to at least one of said frame and said surface and configured to selectively position a tooling head along a length of said fixed rigid horizontal way, under servo control.

6. The system of claim 5, wherein said surface comprises a rigid metal base having holes pre-drilled therein for mounting said fence, said at least one clamping roller, said at least one servo-controlled manipulating roller, said at least one sawing station, said at least one fixed rigid vertical way, and said at least one fixed rigid horizontal way.

7. The system of claim 1, further comprising a prefinishing/finishing station into which components for said project can be selectively processed for application of a selected finishing material.

8. The system of claim 1, further comprising a secondary operations station into which components for said project can selectively receive further processing by manual operations by a store employee.

9. The system of claim 1, further comprising a labeling station at which an identification label is affixed to each component of said project and a set of assembly instructions for said project is printed out.

10. A method, comprising:

providing an interface to receive customer interactions from a customer wishing to evaluate a project, said project including one or more components to be formed of a wood or wood-like material to be fabricated from at least one of a sheet material and a piece of dimensional lumber, said interface permitting said customer to evaluate said project by interacting selectively with at least one of:

a database comprising projects that can be assembled from components fabricated on a tandem machine system that incorporates a capability to machine wood-based components regardless whether derived from sheet material or from dimensional lumber; and a CAD (Computer Aided Design) module that assists said customer to develop a new design for said project or a modification of an existing design already in said database, said CAD module selectively providing a set of instructions to be transmitted to said tandem machine system to form components on said tandem machine system;

said tandem machine system, as comprising:
a first machine for executing machining requirements for wood-based sheet stock; and
a second machine for executing machining requirements for dimensional wood stock, wherein said first machine comprises:
a support frame;
a plurality of backing plates supported by said support frame, said plurality of backing plates being supported to be slightly backward leaning;
a plurality of rollers along a base of said first machine, upon which a sheet of material can slide substantially along a longitudinal axis of said first machine;
a plurality of clamping rollers along a top of said first machine, for clamping said sheet of material firmly to said plurality of rollers along the base;
at least two rotating yoke assemblies that can be selectively rotated into a position to hold said sheet of material against said backing plates;
an upper horizontal guide rail and a lower horizontal guide rail, each mounted on said support frame substantially along said longitudinal axis;
at least two vertical guide rails, interconnected together and movably attached between said upper and lower horizontal guide rails; and
a moveable tooling platform movably attached to said at least two vertical guide rails,
wherein each of said rotating yoke assemblies comprises servo-controlled manipulator rollers for selectively moving said sheet material along said plurality of rollers in either a forward direction or a reverse direction,
wherein said moveable tooling platform is selectively movable in a direction perpendicular to said longitudinal axis, along said at least two vertical guide rails, using servo-controlled actuators, and
wherein said at least two vertical guide rails is selectively movable as a unit along said longitudinal axis, along said upper and lower horizontal guide rails, using servo-controlled actuators;
calculating, using a processor on a computer, an estimated price for said project if said one or more components for said projects were fabricated using said tandem machine system; and
outputting said estimated price as an output of said interface,
wherein, upon a final selection by the customer of an existing previously-designed project, a new project, or a modification of an existing project in said database, said system further selectively provides a set of instructions for said tandem machine system for fabricating the wood-based components of the customer's final selection,
wherein the tandem machine system is located in a home improvement retail store,
wherein the CAD module further comprises a CAM (computer aided manufacture) portion, and the set of instructions for the tandem machine system is generated by the CAD/CAM module;
wherein the first and second machine are selectively controlled via the set of instructions for cutting, shaping, and forming of wooden components of the final selection project, and
wherein an operator sequentially loads raw materials into the tandem machine and changes tooling head attachments for the intended project, as based on commands from the set of instructions generated by the CAD/CAM module.

11. The method of claim 10, further comprising:
receiving from said customer a variation of requirements for said project;
recalculating an estimated price of said project based on said variation; and
outputting said recalculated estimated price as an output of said interface.

12. The method of claim 10, further comprising:
receiving an input from said customer that indicates an acceptance of an order to fabricate one or more components of said project; and
determining a list of materials and developing a set of machining instructions for fabricating said one or more components on at least one of said first machine and said second machine.

13. The method of claim 12, further comprising:
transmitting, to said tandem machine, said machining instructions for fabricating said one or more components.

14. The method of claim 13, further comprising:
preparing a label for each of said one or more components fabricated by said first machine and/or said second machine, each said label to be affixed to an appropriate one of said one or more components as fabricated on one of said first machine and said second machine;
preparing and providing a set of instructions for assembling said project based on said labels affixed to said one or more components.

15. The method of claim 14, further comprising preparing and providing a listing of additional components for said project, said additional components comprising components of said project that are not being fabricated by either of said first machine or said second machine.

16. The method of claim 13, further comprising, upon completion of a machining of a project component on one of said first machine or said second machine, removing said machined component, and at least one of:
preparing and affixing a label to each said machined component;
performing one or more finishing operations on said removed components in a prefinishing/finishing station, said finishing operations comprising applying one or more layers of a finishing material to surfaces of said components;
performing one or more secondary operations on said removed components, said secondary operations comprising one or more of:
providing additional operations on at least one of said removed component, said additional operations comprising at least one of deburring one or more edges and sanding one or more surfaces;
collecting together all components of said project fabricated by said first and second machines into a package of project components to be ready for pick up by said customer; and
collecting together additional components of said project that are not fabricated on said first and second machines and adding said additional components to a package of project components to be ready for pick up by said customer.

17. The method of claim 10, as implemented in a set of machine-readable instructions for execution on a computer, said set of machine-readable instruction tangibly embodied on a non-transitory storage medium.

18. The method of claim 10, wherein the estimated price is based on using prices from a pricing database at a store at which the tandem machine system is located.

* * * * *